United States Patent
Kotani et al.

(10) Patent No.: US 6,789,140 B2
(45) Date of Patent: Sep. 7, 2004

(54) DATA PROCESSOR AND DATA TRANSFER METHOD

(75) Inventors: Atsushi Kotani, Osaka (JP); Yoshiteru Mino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/214,304

(22) Filed: Aug. 8, 2002

(65) Prior Publication Data

US 2003/0033455 A1 Feb. 13, 2003

(30) Foreign Application Priority Data

Aug. 8, 2001 (JP) ........................................ 2001-240825

(51) Int. Cl.$^7$ .............................................. G06F 13/00
(52) U.S. Cl. .............................. 710/20; 710/22; 710/33; 712/18
(58) Field of Search ............................ 710/5–2, 20–35, 710/65, 200, 264, 612; 712/18–22; 701/208; 365/189, 233; 396/429; 713/602; 714/47

(56) References Cited

U.S. PATENT DOCUMENTS

| | | | |
|---|---|---|---|
| 4,896,262 A | * | 1/1990 | Wayama et al. ............. 710/65 |
| 4,912,632 A | * | 3/1990 | Gach et al. .................. 710/28 |
| 5,056,011 A | * | 10/1991 | Yoshitake et al. ........... 710/28 |
| 5,072,365 A | * | 12/1991 | Burgess et al. ............. 710/264 |
| 5,613,162 A | | 3/1997 | Kabenjian .................... 710/22 |
| 5,696,989 A | * | 12/1997 | Miura et al. ................. 710/24 |
| 5,805,927 A | | 9/1998 | Bowes et al. ................ 710/23 |
| 6,175,880 B1 | | 1/2001 | Hsu et al. ..................... 710/5 |
| 6,445,999 B1 | * | 9/2002 | Nakamura ................. 701/208 |
| 6,549,847 B2 | * | 4/2003 | Ikeuchi et al. ............. 701/208 |
| 6,556,920 B2 | * | 4/2003 | Kaneko et al. ............ 701/208 |
| 6,600,993 B1 | * | 7/2003 | Kaneko et al. ............ 701/208 |

FOREIGN PATENT DOCUMENTS

JP          9-319453          12/1997

* cited by examiner

Primary Examiner—Christopher B. Shin
(74) Attorney, Agent, or Firm—McDermott Will & Emery LLP

(57) ABSTRACT

The data processor for processing operation data stored in a memory connected to an external bus in the order of operations includes: an interface section for holding a parameter required for transfer of the operation data; an operation section receiving the operation data from the interface section for performing predetermined processing; and an operation memory for storing the operation data transferred. The interface section sequentially transfers the operation data from the memory connected to the external bus to the operation memory using the parameter, and sequentially transfers the operation data from the operation memory to the operation section.

11 Claims, 20 Drawing Sheets

FIG. 16

| 0X11 (DOT START) | 0X000A (X) | 0X001F |
| --- | --- | --- |
| (Y) | 0X21 (DOT END) | 0X03 (NUMBER OF VERTEXES) |
| 0X0020 (X1) | 0X12 (POLYGON START) | 0X0100 (Y1) |
| 0X0030 (X2) | | 0X01D0 (Y2) |
| 0X0015 (X3) | | 0X0120 (Y3) |
| 0X16 (LINE START) | 0X03 (NUMBER OF VERTEXES) | 0X0000 |
| 0X22 (POLYGON END) | | |

CONTROL FIELD ⟹

START : 0X1x
END   : 0X2x

+

DOT     : 0Xx1
POLYGON : 0Xx2
LINE    : 0Xx6

DATA PROCESSOR AND DATA TRANSFER METHOD

BACKGROUND OF THE INVENTION

The present invention relates to a data processor for processing data transferred from a system bus and a data transfer method employed by the data processor.

FIG. 20 is a block diagram of a conventional data processor. The data processor of FIG. 20 is a drawing processor including a host CPU 91 for control of the entire drawing apparatus, a main memory 92 used by the host CPU 91, a drawing processing unit 93, a drawing memory 94 and a main bus 95.

The drawing processing unit 93 includes a CPU interface 96 functioning as the interface with the host CPU 91, a data processing section 97, and a drawing memory interface 98 functioning as the interface with the drawing memory 94. The data processing section 97 performs issuance of an interrupt request to the host CPU 91 and the like when data processing under control of the host CPU 91 via the CPU interface 96 and supply of data to be processed are necessary and in other occasions. The drawing memory 94 includes a drawing command region and a frame region, and stores drawing data in the drawing command region and drawing-processed data in the frame region. The main bus 95 connects the host CPU 91, the main memory 92 and the drawing processing unit 93 with one another.

In the conventional data processor described above, supply of data to the drawing processing unit 93 is totally performed under control of the host CPU 91. To state specifically, when supply of data is necessary, the drawing processing unit 93 sends an interrupt signal IS to the host CPU 91 to request an interrupt. Receiving the interrupt, the host CPU 91 supplies data to the drawing processing unit 93 to be stored in the drawing memory.

In general, for reduction in power consumption, supply of a clock signal is partly halted depending on the operation mode of an apparatus, and power supply is turned off depending on the operation mode. Also, as disclosed in Japanese Laid-Open Patent Publication No. 9-319453, for example, the following measures are taken to reduce power consumption. A processor or the like halts supply of a clock signal or power to an unused operator according to an instruction, or supplies a clock signal or power only to a portion of a register or an operator related to eight lower-order bits, for example, depending on the bit length of an instruction.

However, when a drawing apparatus as shown in FIG. 20 is used to construct a system such as a car navigation system, the performance of the CPU is lost by frequent occurrence of data transfer, resulting in deterioration in the performance as the system. To suppress the deterioration in performance, the capacities of the drawing memory and the main memory may be increased. However, this disadvantageously increases the cost.

A digital signal processor (DSP), an application-specific integrated circuit (ASIC) and the like are controlled under instructions from the host CPU controlling these devices. Therefore, when reduction in power consumption is intended for the DSP, ASIC and the like, only macro control is permitted in which processing is halted from start to end in a certain internal operator while processing is performed from start to end in another internal operator. For this reason, delicate power control to an internal block level is not possible when different internal parts operate with different processing data items.

SUMMARY OF THE INVENTION

An object of the present invention is providing a data processor capable of lightening the load of a host CPU during data transfer.

Another object of the present invention is providing a data processor with reduced power consumption.

According to the present invention, the data processor, which is controlled by an external bus master such as a host CPU, includes a control register for holding information such as an address at which data to be processed is stored and the number of words to be transferred, so that the data processor itself can serve as a bus master to perform data transfer to an operation memory without putting a load on the external bus master.

To state specifically, the present invention is directed to a data processor for processing operation data stored in a memory connected to an external bus in the order of operations, including: an interface section for holding a parameter required for transfer of the operation data; an operation section receiving the operation data from the interface section for performing predetermined processing; and an operation memory for storing the operation data transferred, wherein the interface section sequentially transfers the operation data from the memory connected to the external bus to the operation memory using the parameter, and sequentially transfers the operation data from the operation memory to the operation section.

With the above configuration, the data processor itself transfers operation data according to the parameter held by the control register, to acquire the data. This lightens the load related to data transfer processing on the external bus master such as a host CPU.

In the data processor described above, preferably, the interface section transfers transfer information for transfer of operation data to be next processed to the operation memory, together with the operation data, and when reading the transfer information from the operation memory, the interface section sequentially transfers the operation data corresponding to the transfer information from the memory connected to the external bus to the operation memory.

With the above configuration, the data processor can read transfer information for transfer of operation data to be processed next, and thus the data processor itself can start DMA transfer and acquire the operation data. This prevents the external bus master controlling the external bus from being loaded with parameter setting when parameters for DMA transfer must be set repeatedly, for example, when an operation data group must be divided for transfer because the capacity of the operation memory is limited, and when operation data groups must be sequentially generated and transferred to the data processing section.

Preferably, the data processor described above further includes a data transfer management section for holding information indicating whether or not the interface section is under transfer of the operation data.

With the above configuration, the data processor is provided with the data transfer management section that makes a notification of completion of DMA transfer instructed from the external bus master. This makes it possible to overwrite a region of the memory connected to the external bus from which data has already been read, and thus eliminates the necessity of unduly increasing the capacity of the memory connected to the external bus. The cost of the data processor can therefore be reduced.

In the data processor described above, preferably, the interface section notifies an external bus master controlling the external bus of termination of transfer of the operation data by generating an interrupt.

With the above configuration, the data processor itself can notify the external bus master of the status of data transfer. Therefore, the external bus master can timely know the timings of preparation of data required for the next operation, transfer of the data to the memory connected to the external bus, and the like.

In the data processor described above, preferably, the interface section includes a data transfer wait register holding information set by the external bus master controlling the external bus when start of transfer of the operation data is newly required, and halts the current transfer of the operation data according to the information held by the data transfer wait register.

With the above configuration, in occurrence of sudden data change, the interface section can halt currently-running DMA transfer and start new transfer.

In the data processor described above, preferably, the operation section includes a plurality of circuits for processing commands included in the operation data, and the interface section supplies a clock signal to a circuit among the plurality of circuits that processes a command included in the operation data transferred to the operation section according to a control field of the command.

With the above configuration, a portion of the operation section required for the next processing is known prior to transfer of data for the processing to the operation section. Therefore, the clock signal can be supplied under control only to the portion of which activation is actually required. Thus, reduction in power consumption is possible.

Preferably, the interface section starts supply of the clock signal according to a first control field located at the head of the command, and halts the supply of the clock signal according to a second control field located at the end of the command.

With the above configuration, supply of the clock can be started before start of a command and halted after the processing of the command.

Preferably, the circuit of the operation section receiving the clock signal outputs a done signal indicating termination of the processing of the transferred command to the interface section, and the interface section starts supply of the clock signal according to a control field located at the head of the command, and halts the supply of the clock signal to the circuit that has outputted the done signal upon receipt of the done signal.

With the above configuration, each circuit of the operation section itself halts supply of the clock signal after termination of processing. Therefore, the interface section is relieved of timing control for halting the clock signal.

BRIEF DESCRIPTION OF THE DRAWINGS

FIG. 16 is an illustration of an example of drawing commands received by a prefetch section shown in FIG. 15.

DESCRIPTION OF THE PREFERRED EMBODIMENTS

Hereinafter, preferred embodiments of the present invention will be described with reference to the accompanying drawings. Note that in the embodiments to follow, described are data processors performing drawing as an example of operation. Note herein that operation data includes both commands such as drawing commands and data and the like used for execution of the commands.

Embodiment 1

Figure 1:
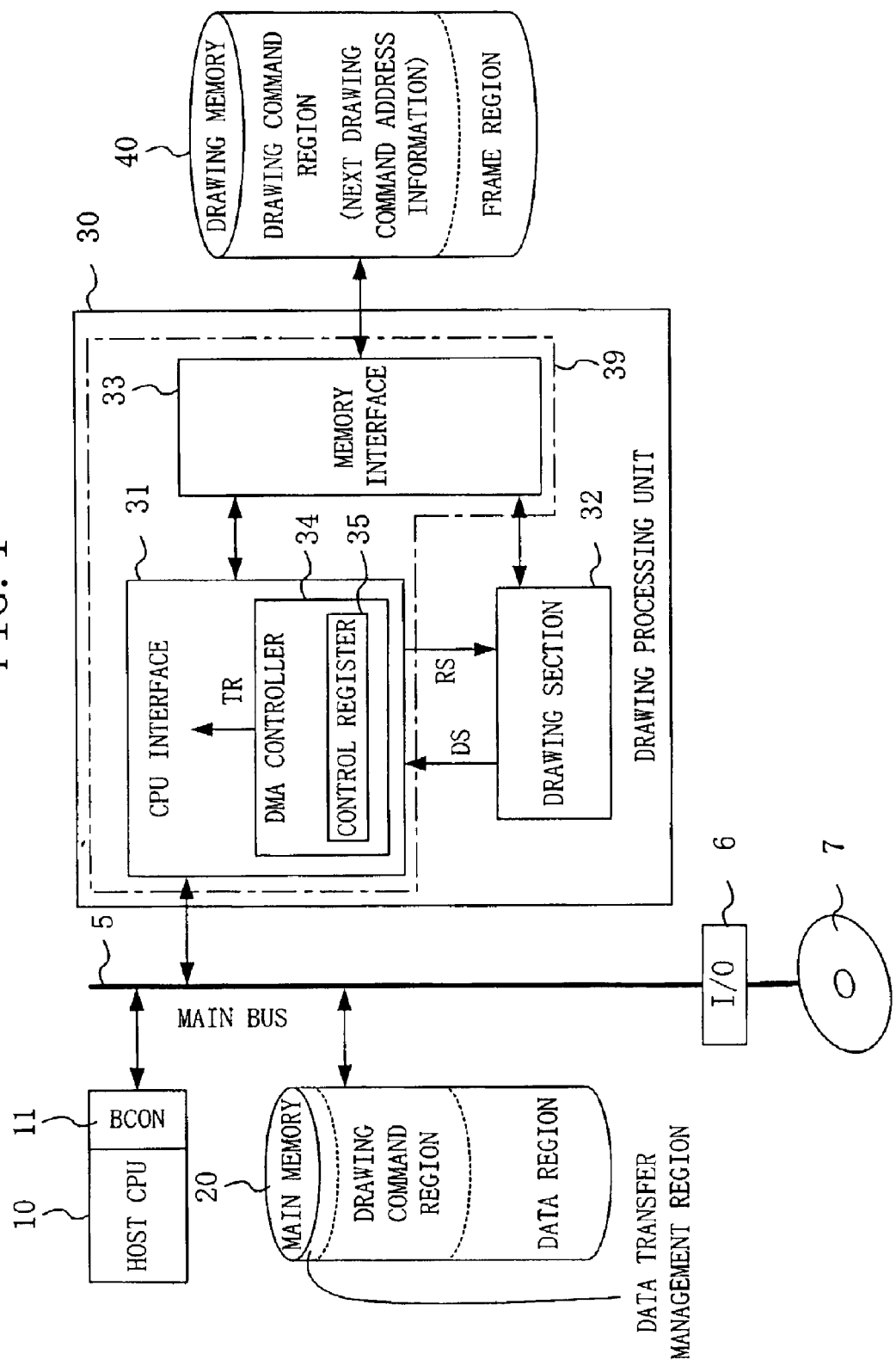
FIG. 1 is a block diagram of a data processor of Embodiment 1 of the present invention.

FIG. 1 is a block diagram of a data processor of Embodiment 1 of the present invention. The data processor of FIG. 1 includes a host CPU 10, a main memory 20, a drawing processing unit 30, a drawing memory 40 as the operation memory, a main bus 5 as the external bus (system bus), an I/O block 6 and a DVD-ROM 7.

The host CPU 10 controls the data processor of FIG. 1 in various ways. The main memory 20 stores drawing commands sent from the host CPU 10 and other kinds of data. The drawing processing unit 30, activated by the host CPU 10, performs drawing processing. The drawing memory 40 stores drawing commands required for the drawing processing unit 30 to perform drawing and frame data for a display screen. The main bus 5 connects the host CPU 10, the main memory 20 and the drawing processing unit 30 with one another. The I/O block 6 connects the DVD-ROM 7 with the main bus 5. A database of drawing data is stored in the DVD-ROM 7.

The host CPU 10 includes a bus controller 11 serving as both an interface with the main bus 5 and an arbitrator for the main bus 5. The drawing processing unit 30 includes a CPU interface 31, a drawing section 32 as an operator for actually performing drawing processing, and a memory interface 33. The CPU interface 31 and the memory interface 33 constitute an interface section 39.

The CPU interface 31, functioning as an interface with the main bus 5, includes a direct memory access (DMA) controller 34. The DMA controller 34 includes a control register 35 for holding parameters required for DMA transfer, and controls data transfer between the main memory 20 and the drawing processing unit 30. The memory interface 33 functions as an interface with the drawing memory 40. The memory interface 33 also performs data transfer with the CPU interface 31 and data transfer with the drawing section 32.

Figure 2:
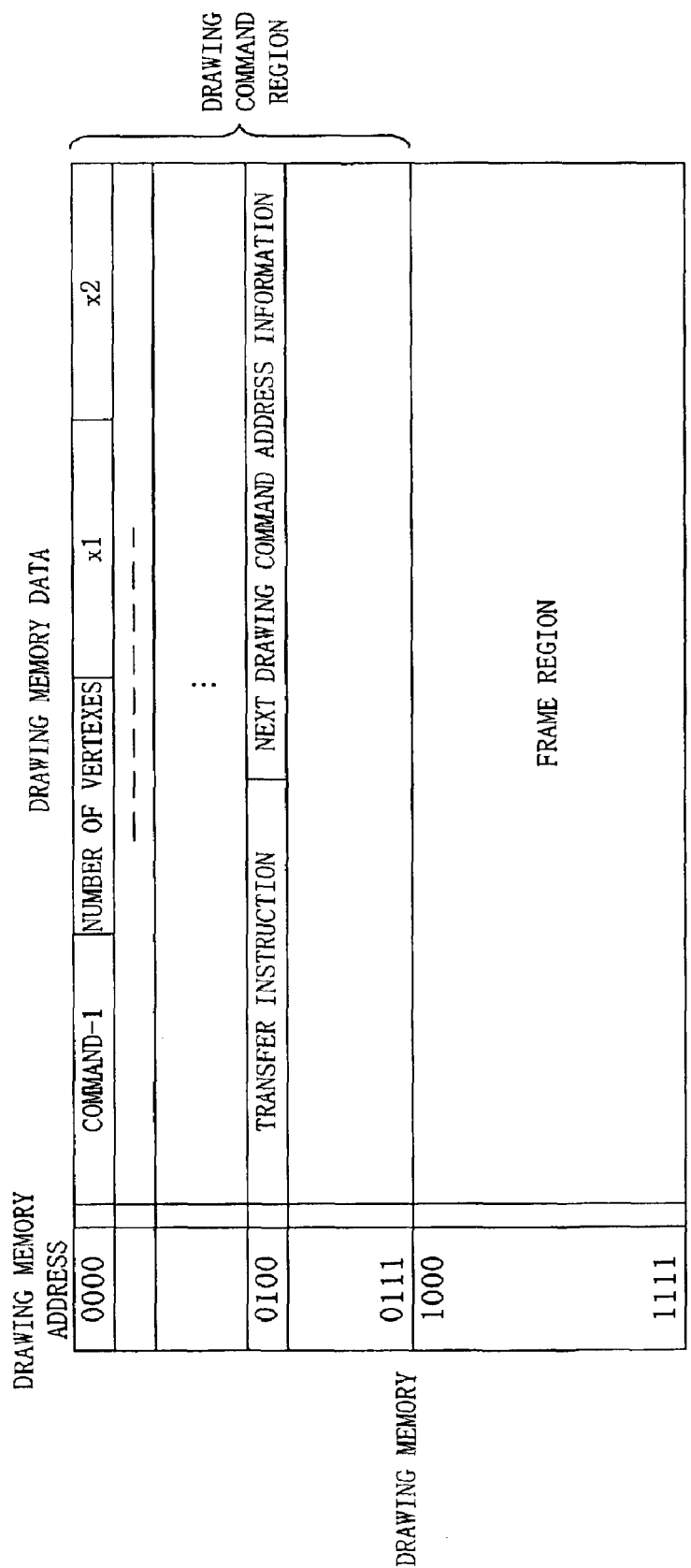
FIG. 2 is an illustration of an example of arrangement of data stored in a drawing memory shown in FIG. 1.

FIG. 2 illustrates an example of arrangement of data stored in the drawing memory 40 shown in FIG. 1. In this example, transfer information on a drawing command group to be transferred and read subsequent to the current drawing command group stored in the drawing memory 40 is transferred simultaneously with the DMA transfer of the current drawing command group at the end of the current drawing command group. The transfer information on the next drawing command group includes the drawing command address in the main memory 20 as the transfer source, the number of words to be transferred, and the drawing command address in the drawing memory 40 as the transfer destination (hereinafter, these items of information are collectively called next drawing command address information).

The drawing memory 40 has an area corresponding to a 16-bit address space. A half of the area is used as a drawing command region and the remainder as a frame region. As shown in FIG. 2, the drawing memory 40 stores the next drawing command address information together with a transfer instruction at the end of the current drawing command group stored in the drawing command region.

As the drawing processing proceeds, the drawing section 32 retrieves and decodes the transfer instruction. Once decoding the transfer instruction, the drawing section 32 outputs a Done signal DS to the DMA controller 34 as a transfer request. Upon receipt of the Done signal DS, the DMA controller 34 sets the next drawing command address information in the control register 35 and outputs a transfer request signal TR. The CPU interface 31 then starts DMA transfer according to the information held by the control register 35.

In the illustrated example, the drawing section 32 retrieves the transfer instruction. Alternatively, the DMA controller 34 may retrieve and decode the transfer instruction. In this case, transfer of the transfer instruction to the drawing section 32 is not required. In FIG. 2, the next drawing command address information is stored at the end of the current drawing command group transferred to the drawing memory 40. Alternatively, next drawing command address information may be located at the head of the current drawing command group transferred, or in the middle of the current drawing command group transferred. In these cases, a drawing command empty flag may be set when the transfer instruction is read from the drawing memory 40 to the drawing processing unit 30, to enable the DMA controller 34 to detect shortage of drawing commands in the drawing memory 40 and issue the drawing command transfer request.

Figure 3:
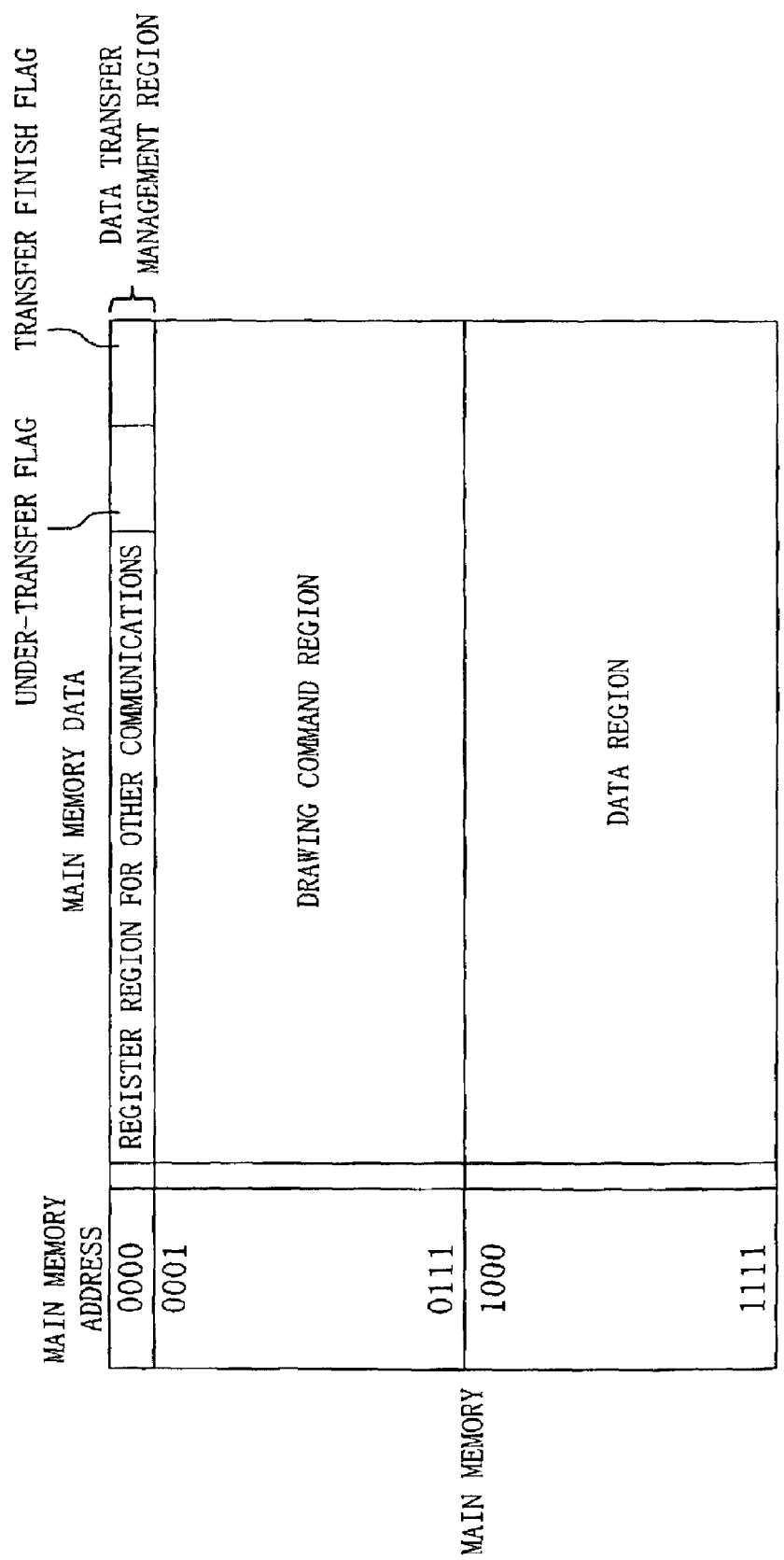
FIG. 3 is an illustration of an example of arrangement of data stored in a main memory shown in FIG. 1.

FIG. 3 illustrates an example of arrangement of data stored in the main memory 20 shown in FIG. 1. The main memory 20 has an area corresponding to a 16-bit address space, and includes a data transfer management region operating as a data transfer manager at the head address, a drawing command region occupying roughly a half of the entire area, and a frame region as the remainder.

In the drawing command region, drawing commands are stored in the order of drawing. In the data transfer management region, stored are an under-transfer flag asserted when DMA transfer is underway between the drawing processing unit 30 and the main memory 20, and a transfer finish flag asserted when the DMA transfer is finished. The host CPU 10 reads these flags from the main memory 20 to detect whether or not overwrite of the drawing command group currently stored in the main memory 20 is possible. If overwrite is possible, the host CPU 10 places a drawing command group to be next transferred to the drawing processing unit 30 in the drawing command region of the main memory 20.

In the illustrated example, the data transfer management region is placed in the main memory 20 as a data transfer manager specifying the transfer state. Alternatively, a data transfer manager having a state register may be provided somewhere apart from the main bus 5, in which both the host CPU 10 and the drawing processing unit 30 can set and monitor the respective transfer states in the state register. The data transfer manager with this configuration may notify the host CPU 10 and the drawing processing unit 30 of the state of use of the main memory 20.

Figure 4:
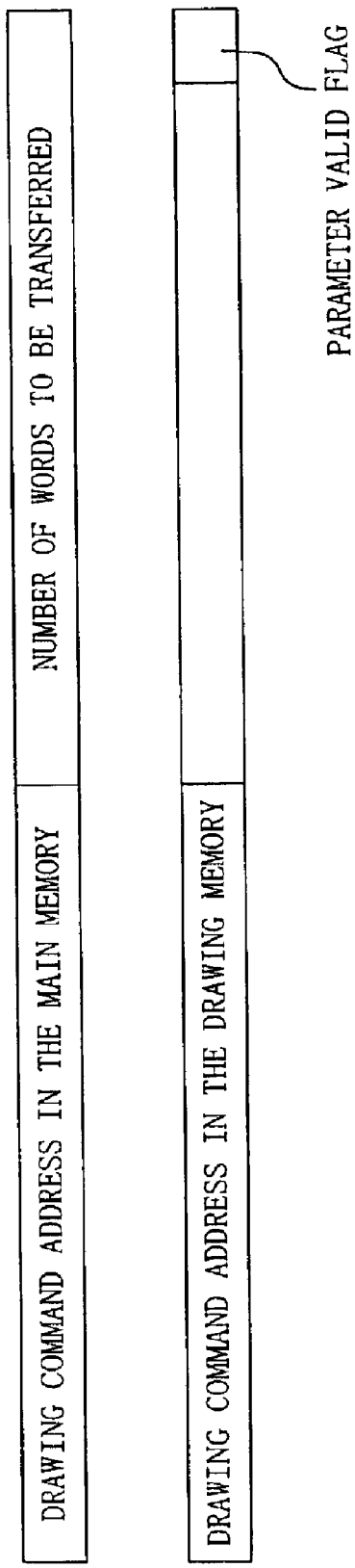
FIG. 4 is an illustration of an example of parameters held by a control register shown in FIG. 1.

FIG. 4 illustrates an example of parameters held by the control register 35 shown in FIG. 1. The control register 35 holds a drawing command address in the main memory, the number of transfer words indicating the number of words of data to be transferred, a drawing command address in the drawing memory, and a parameter valid flag. The drawing command address in main memory indicates the head address of drawing commands in the main memory 20 in which the drawing commands are currently stored. The drawing command address in the drawing memory indicates the head address of the drawing commands in the drawing memory 40 into which the drawing commands are to be transferred and stored. The parameter valid flag is a flag used by the DMA controller 34 to notify that the parameters in the control register 35 have been read at the completion of the DMA transfer.

Figure 5:
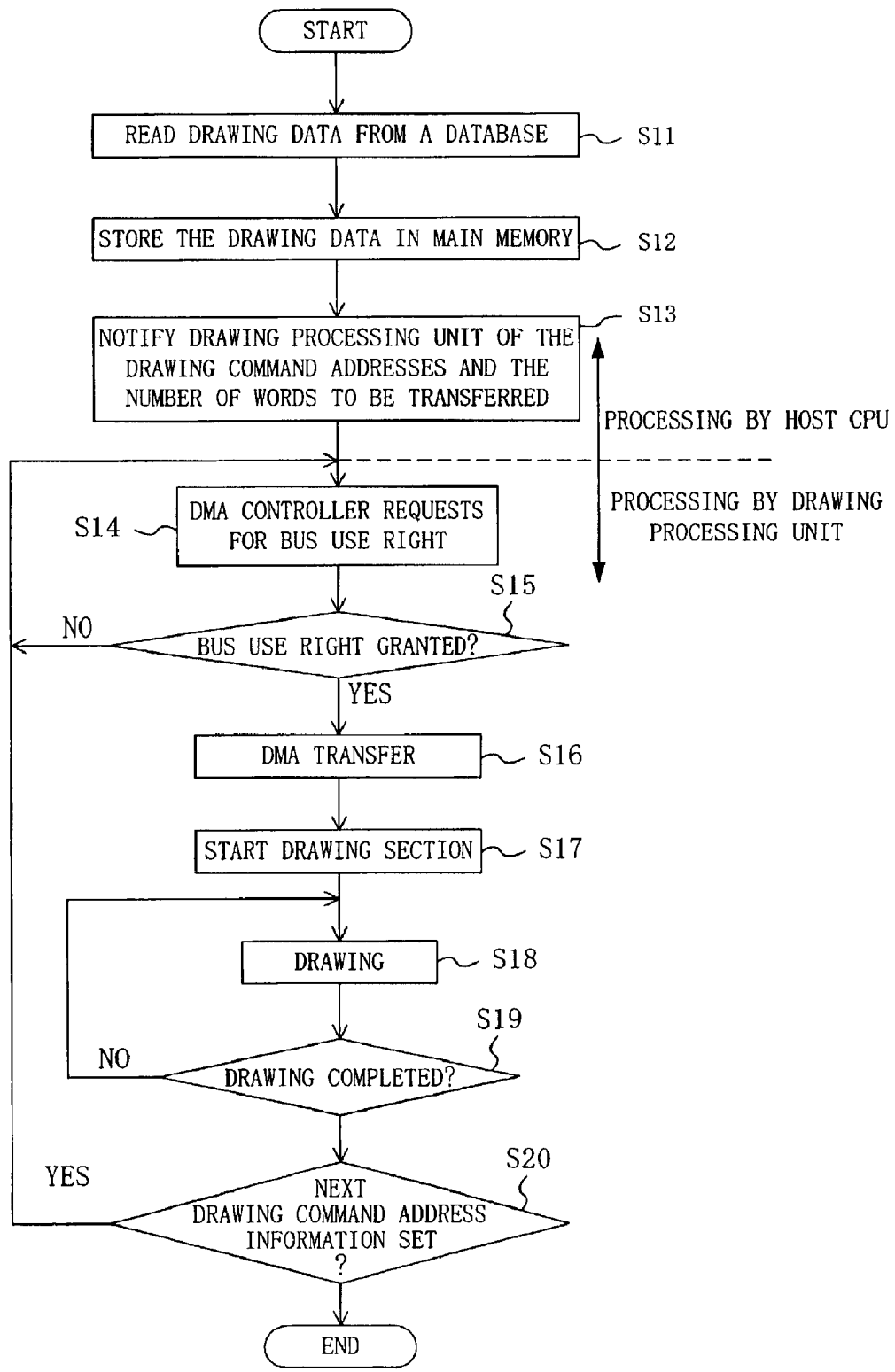
FIG. 5 is a flowchart of processing by the data processor of FIG. 1.

FIG. 5 is a flowchart of processing by the data processor of FIG. 1. Note that this flowchart shows only drawing-related processing and does not show any other system-related processing performed by the host CPU 10. The flow of basic processing performed by the data processor of FIG. 1 will be described with reference to FIGS. 1 and 5.

In step S11, the data processor of FIG. 1 is activated, and the host CPU 10 reads necessary drawing data from the DVD-ROM 7 into the main memory 20.

In step S12, the host CPU 10 performs processing for the read data required for transfer of the data to the drawing processing unit 30, and sends resultant drawing commands to the drawing command region of the main memory 20 shown in FIG. 3. The processing required before transfer of the data to the drawing processing unit 30 differs with the format of the drawing data stored in the DVD-ROM 7 and the configuration of the drawing processing unit 30. Herein, assume that the processing includes preprocessing for drawing such as tilt calculation and graphic clipping for transfer of the data to the drawing processing unit 30. Clipping is processing of cutting off a protrusion when part of a graphic protrudes from a certain limited space such as a display region.

In step S13, the host CPU 10 sets the head address of the preprocessed drawing commands in the main memory 20, the number of words to be transferred, and the destination address of the drawing commands in the drawing memory 40 as the destination in the control register 35 of the drawing processing unit 30. In step S14, the DMA controller 34 sends an access request to the bus controller 11 operating as the bus arbitrator via the CPU interface 31.

In step S15, the DMA controller 34 determines whether or not bus use permission (bus use right) has been granted by the bus arbitrator (bus controller 11). If no bus use permission is granted, the process returns to step S14, and the DMA controller 34 continues sending a bus use request. Once bus use permission is granted, the process proceeds to step S16, where the DMA controller 34 performs DMA transfer of the drawing commands from the main memory 20 to the drawing memory 40 according to the addresses and the number of words set in the control register 35.

After completion of the DMA transfer of the set number of words, in step S17, the DMA controller 34 negates the parameter valid flag in the control register 35, to notify that the parameters in the control register 35 have been read. The CPU interface 31 outputs a Run signal RS to the drawing section 32 to activate the drawing section 32 for start of drawing. In step S18, the drawing section 32 starts drawing.

In step S19, the drawing section 32 determines whether or not the drawing for the drawing commands in the drawing memory 40 has been completed. If determining that the drawing has been completed, the drawing section 32 asserts the Done signal DS sent to the DMA controller 34, and the process proceeds to step S20. Otherwise, the process returns to step S18.

In step S20, upon receipt of the Done signal DS, the DMA controller 34 examines the parameter valid flag set in the control register 35 to determine whether or not new next drawing command address information has been set. If no new next drawing command address information has been set, that is, the parameter valid flag stays negated, the DMA controller 34 terminates the processing and waits for setting of next drawing command address information. If the host CPU 10 has prepared new drawing commands in the main memory 20 and the parameter valid flag has been asserted during the time period from step S17 through step S19, the process returns to step S14 so that the DMA controller 34 can perform transfer and drawing of the new drawing commands.

As described above, the drawing processing unit 30 itself can acquire drawing commands according to the parameters set by the host CPU 10. Thus, since the drawing processing unit can take the load of data transfer processing that is conventionally put on the host CPU, the load on the host CPU during data transfer is lightened.

(First Alteration to Embodiment 1)

Figure 6:
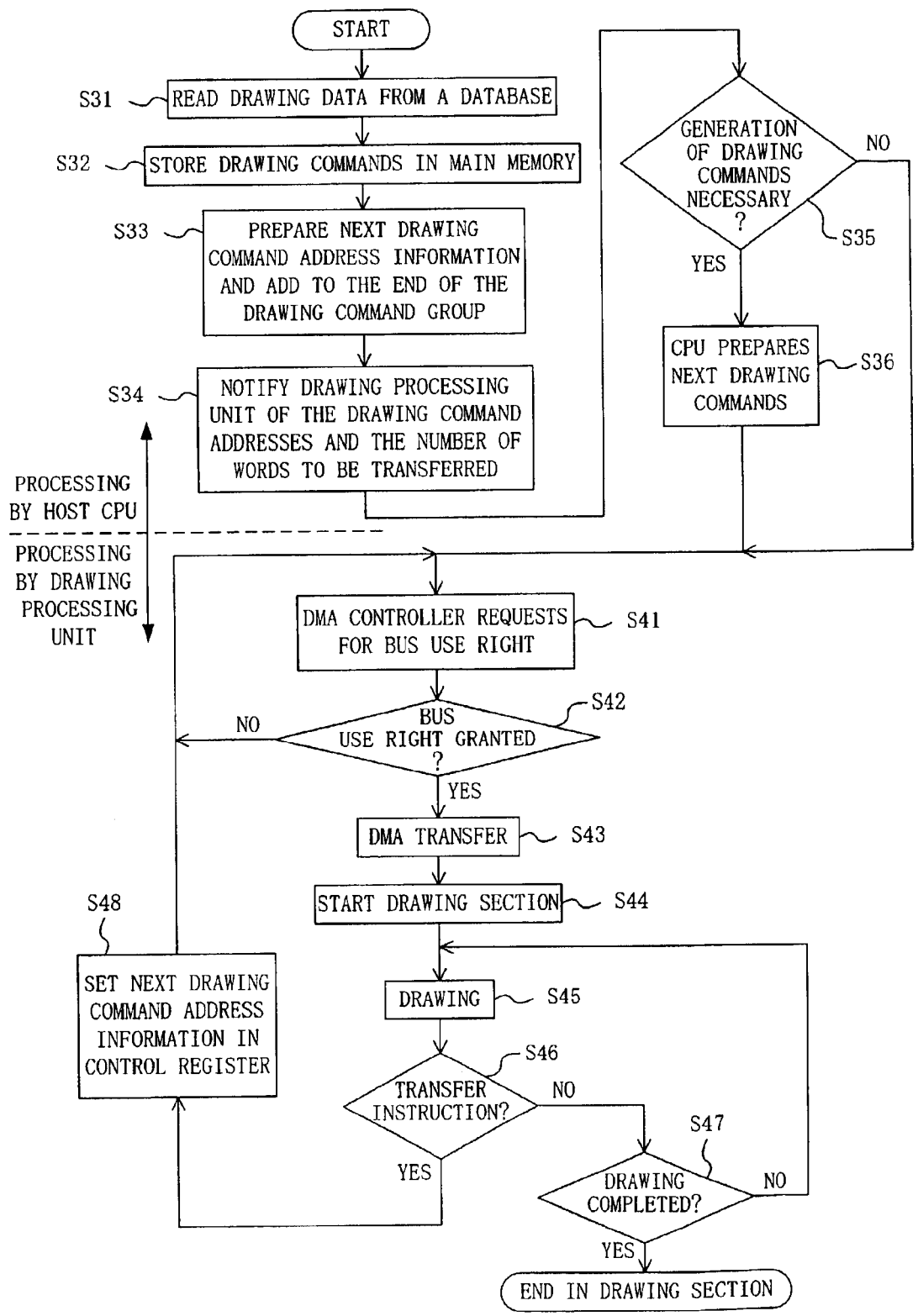
FIG. 6 is a flowchart of processing by a data processor of the first alteration to Embodiment 1 of the present invention.

FIG. 6 is a flowchart of processing by a data processor of the first alteration to Embodiment 1 of the present invention. Note that this flowchart shows only drawing-related processing and does not show any other system-related processing performed by the host CPU 10. The configuration of the data processor of this alteration is substantially the same as that of the data processor of FIG. 1. Therefore, the flow of processing performed by the data processor of the first alteration is described with reference to FIGS. 1 and 6.

Processing in steps S31 and S32 is substantially the same as the processing in steps S11 and S12 described above with reference to FIG. 5, and thus the description thereof is omitted here. In step S33, the host CPU 10 places next drawing command address information on a drawing command group intended to be transferred next to the coming transfer at the end of the drawing command group prepared in the main memory 20. Processing in step S34 is substantially the same as the processing in step S13.

In step S35, the host CPU 10 determines whether or not it is necessary to generate drawing commands intended to be transferred next. If necessary, the process proceeds to step S36. Otherwise, the process proceeds to step S41, and the host CPU 10 terminates processing related to drawing and performs other processing.

In step S36, the host CPU 10 prepares the next drawing commands in the region of the main memory 20 according to the next drawing command address information transferred to the drawing memory 40 together with the drawing commands.

Processing in steps S41 to S45 is the same as the processing in steps S14 to S18 described above, except that in step S42, the process returns to step S41 if no bus use permission is granted and otherwise proceeds to step S43. The description of these steps is therefore omitted here.

In step S46, the drawing section 32 determines whether or not the drawing command retrieved from the drawing memory 40 is a transfer instruction. If the retrieved drawing command is a transfer instruction, the process proceeds to step S48. Otherwise, the process proceeds to step S47.

In step S47, the drawing section 32 determines whether or not the drawing related to the drawing commands in the drawing memory 40 has been completed. If it is determined that the drawing has been completed, that is, if a drawing end instruction has been received, or if all the drawing commands transferred have been executed, the drawing section 32 asserts the Done signal DS sent to the DMA controller 34, and terminates the processing. If it is determined that the drawing has not been completed, the process returns to step S45.

In step S48, the drawing section 32 asserts the Done signal DS sent to the CPU interface 31. On receipt of the Done signal DS, the CPU interface 31 sets the next command address information in the control register 35. The process returns to step S41 for execution of DMA transfer and drawing processing for the new drawing commands.

As described above, in the first alteration, the drawing processing unit 30 itself can acquire drawing commands according to the parameters set by the host CPU 10. In addition, since information on the address at which drawing commands required next are stored and the like is transferred together with the current drawing commands, the drawing processing unit 30 itself can start DMA transfer and acquire drawing commands. As a result, the host CPU can be relieved of the load of setting parameters for DMA transfer every time the transfer is performed in such cases that data must be divided into a plurality of parts for transfer due to limitation of the capacity of the drawing memory, that data is stored sporadically in the main memory, and that the host CPU must generate drawing command groups in sequence and transfer them to the drawing processing unit. This also enables continuous data transfer.

Although only the transfer from the main memory 20 connected to the external bus to the drawing memory 40 was described, substantially the same procedure is adopted for data transfer from the drawing memory 40 to the drawing section 32. That is, even when data is stored sporadically in the drawing memory 40, continuous data read is possible based on the drawing command address in the drawing memory.

(Second Alteration to Embodiment 1)

Figure 7:
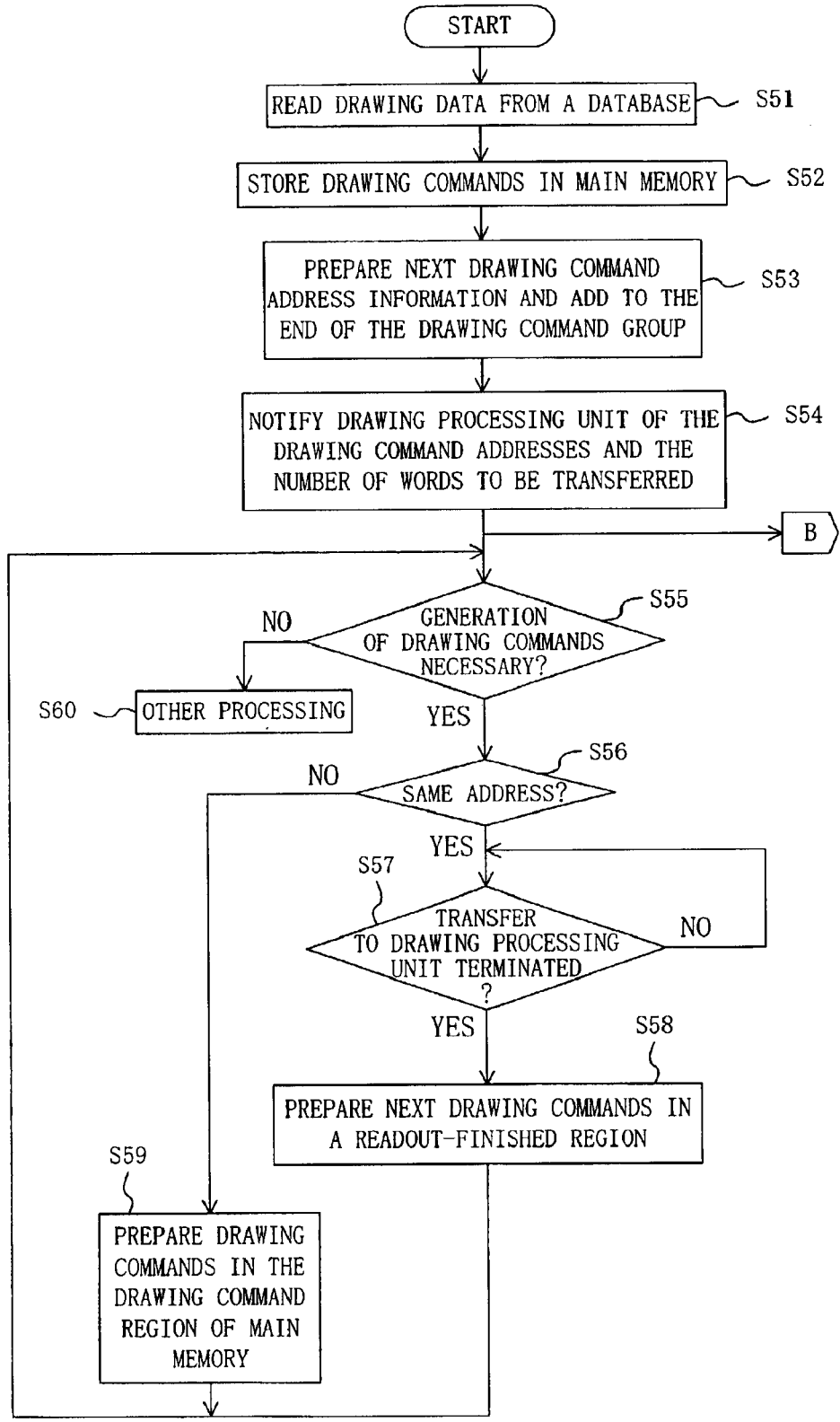
FIG. 7 is a flowchart of processing by a data processor of the second alteration to Embodiment 1 of the present invention, showing processing related to a host CPU shown in FIG. 1.
Figure 8:
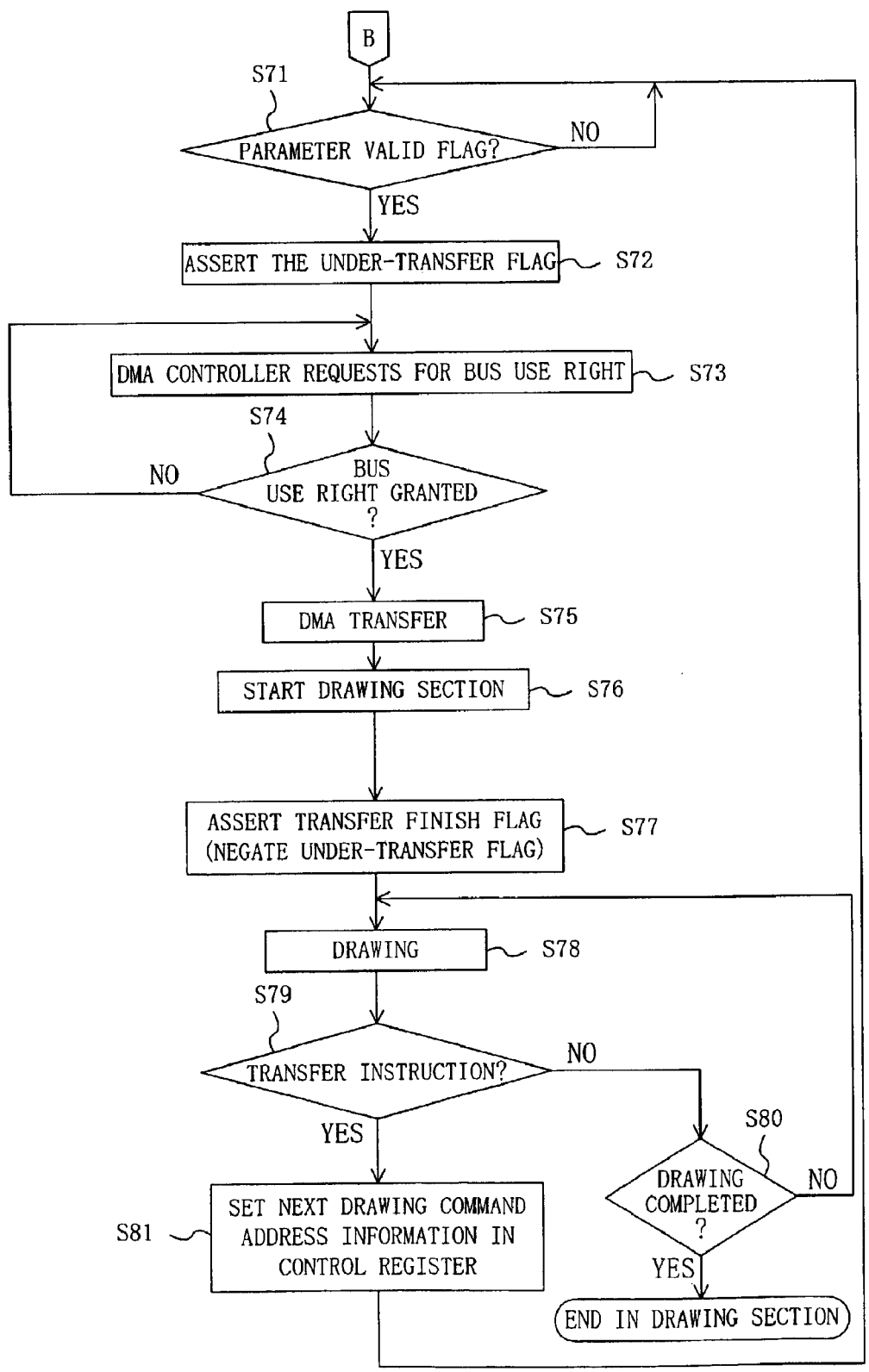
FIG. 8 is a flowchart of processing by the data processor of the second alteration to Embodiment 1 of the present invention, showing processing related to a drawing processing unit shown in FIG. 1.

FIGS. 7 and 8 are flowcharts of processing of a data processor of the second alteration to Embodiment 1 of the present invention, in which FIG. 7 shows processing related to the host CPU 10 in FIG. 1 and FIG. 8 shows processing related to the drawing processing unit 30 in FIG. 1. Note that the flowcharts of FIGS. 7 and 8 show only drawing-related processing and do not show any other system-related processing performed by the host CPU 10. The configuration of the data processor of this alteration is substantially the same as that of the data processor of FIG. 1. Therefore, the flow of processing performed by the data processor of the second alteration is described with reference to FIGS. 1, 7 and 8. In this alteration, the data transfer management region is used.

Processing in steps S51 to S54 is substantially the same as the processing in steps S31 to S34 described above with reference to FIG. 6, and thus the description thereof is omitted here.

In step S55, the host CPU 10 determines whether or not it is necessary to generate drawing commands intended to be transferred next. If necessary, the process proceeds to step S56. Otherwise, the process proceeds to step S60, in which the host CPU 10 terminates processing related to drawing and performs other processing.

In step S56, the host CPU 10 examines whether or not the head address of drawing commands in the main memory 20 intended to be set next is the same as that in the previous setting. If the head address of the next drawing commands is the same as that in the previous setting, or coincides with the memory space in the main memory 20 in the previous setting, the process proceeds to step S57. Otherwise, if the head address of the next drawing commands is an address totally irrelevant to that in the previous setting, the process proceeds to step S59. In step S59, the host CPU 10 prepares the next drawing commands in the drawing command region of the main memory 20, and the process returns to step S55.

In step S57, the host CPU 10 examines the data transfer management region of the main memory 20 to check the transfer finish flag indicating whether or not the drawing procession section 30 has finished the transfer of the drawing commands. If the transfer has been finished, the process proceeds to step S58. Otherwise, step S57 is repeated.

In step S58, the host CPU 10 prepares the next drawing commands in the region of the main memory 20 from which the drawing commands have already been read (readout-finished region), and the process returns to step S55.

After the next drawing command address information is set in the control register 35 by the host CPU 10 in step S54, the drawing processing unit 30 checks the parameter valid flag in step S71 in FIG. 8. If the parameter valid flag is in the negated state, step S71 is repeated and waits until the flag is asserted. When the parameter valid flag is in the asserted state, the process proceeds to step S72.

In step S72, the drawing processing unit 30 asserts the under-transfer flag in the data transfer management region of the main memory 20. Processing in steps S73 to S76 and S78 is substantially the same as the processing in steps S41 to S45 described with reference to FIG. 6, and thus the description thereof is omitted here. In step S77, the DMA controller 34 asserts the transfer finish flag in the data management region of the main memory 20.

In step S79, the drawing section 32 determines whether or not the drawing command retrieved from the drawing memory 40 is a transfer instruction. If the retrieved drawing command is a transfer instruction, the process proceeds to step S81. Otherwise, the process proceeds to step S80.

In step S80, the drawing section 32 determines whether or not the drawing has been completed. If it is determined that the drawing has been completed, that is, if a drawing end instruction has been received, or if all the drawing commands transferred have been executed, the drawing section 32 asserts the Done signal DS sent to the DMA controller 34, and terminates the drawing processing. If it is determined that the drawing has not been completed, the process returns to step S78.

In step S81, the drawing section 32 asserts the Done signal DS sent to the CPU interface 31. On receipt of the Done signal DS, the CPU interface 31 sets the next drawing command address information in the control register 35. The process returns to step S71 for execution of DMA transfer and drawing processing for the new drawing commands.

As described above, this alteration uses the data transfer management region that manages the data transfer by indicating that the DMA transfer instructed by the host CPU has been completed. This makes it possible to overwrite the region of the main memory 20 from which the drawing commands have been read with new drawing commands. Therefore, undue increase of the capacity of the main memory is prevented and thus the cost can be reduced. In addition, if the data transfer management section is placed at a position permitting poling from the host CPU, the timing of start of next data transfer to the drawing processing unit and the timing of transfer of data to the main memory can be make known.

Embodiment 2

Figure 9:
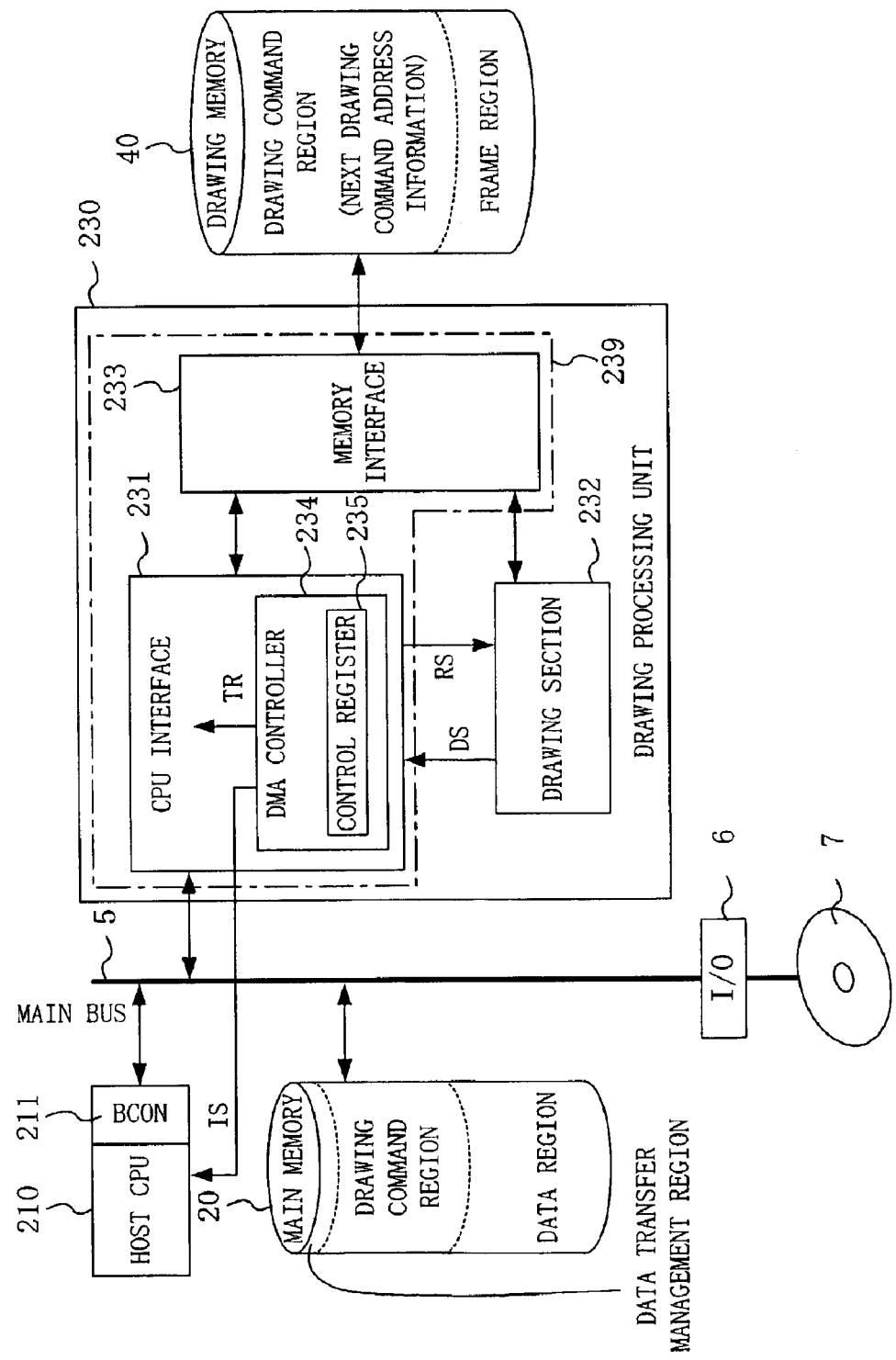
FIG. 9 is a block diagram of a data processor of Embodiment 2 of the present invention.

FIG. 9 is a block diagram of a data processor of Embodiment 2 of the present invention. The data processor of FIG. 9 includes a host CPU 210, a main memory 20, a drawing processing unit 230, a drawing memory 40, a main bus 5, an I/O block 6 and a DVD-ROM 7. The host CPU 210 corresponds to the host CPU 10 in FIG. 1. The same components as those of the data processor of FIG. 1 are denoted by the same reference numerals, and the description thereof is omitted here.

The drawing processing unit 230 includes a CPU interface 231, a drawing section 232 for actually performing drawing processing, and a memory interface 233. The CPU interface 231, functioning as an interface with the main bus 5, includes a DMA controller 234. The DMA controller 234 includes a control register 235 for holding parameters required for DMA transfer, and controls data transfer between the main memory 20 and the drawing processing unit 230. The DMA controller 234 also outputs an interrupt signal IS to the host CPU 210 depending on the transfer state. The drawing section 232 and the memory interface 233 correspond to the drawing section 32 and the memory interface 33 in FIG. 1, respectively. The CPU interface 231 and the memory interface 233 constitute an interface section 239.

Figure 10:
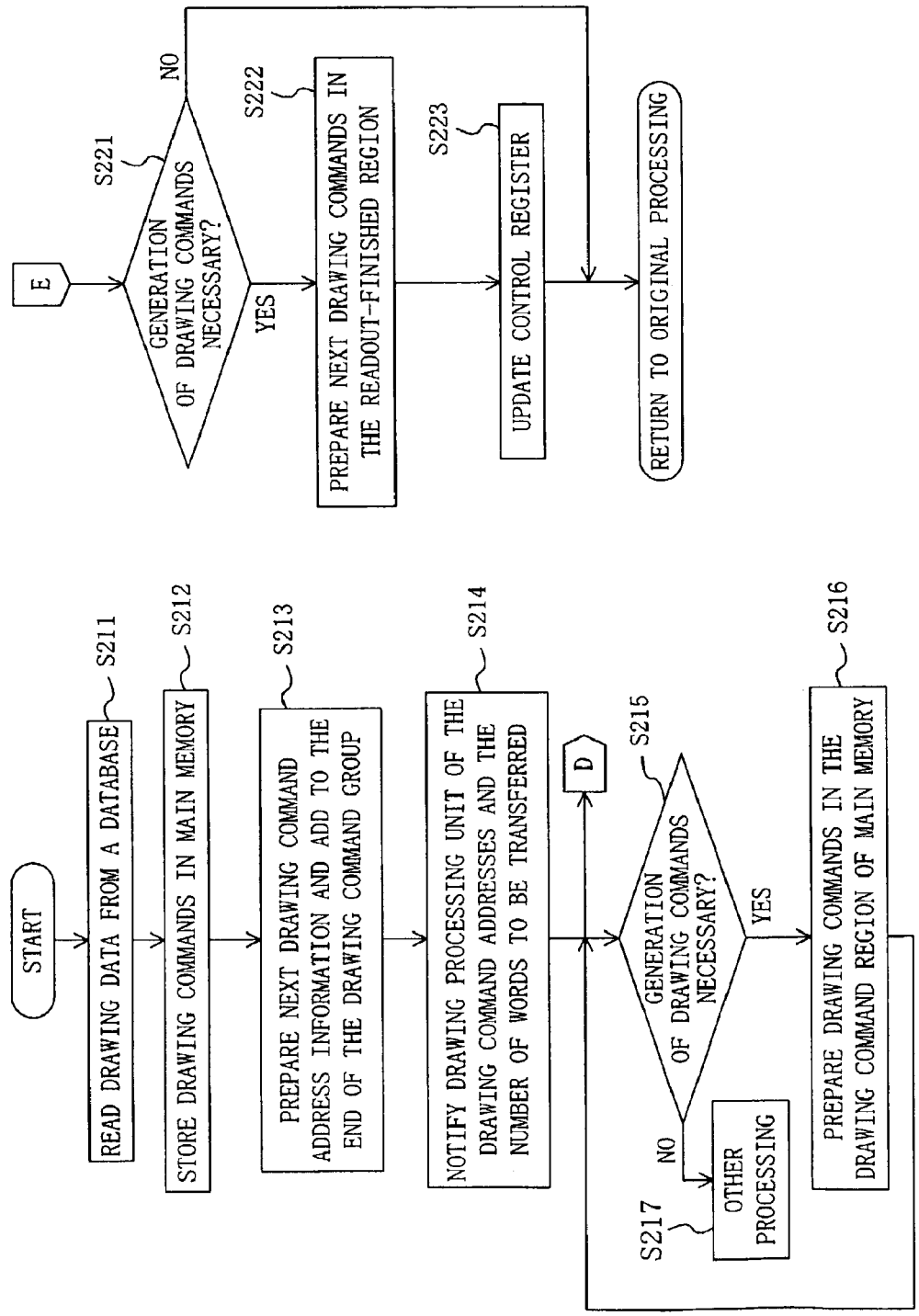
FIG. 10 is a flowchart of processing by the data processor of FIG. 9, showing processing related to a host CPU.
Figure 11:
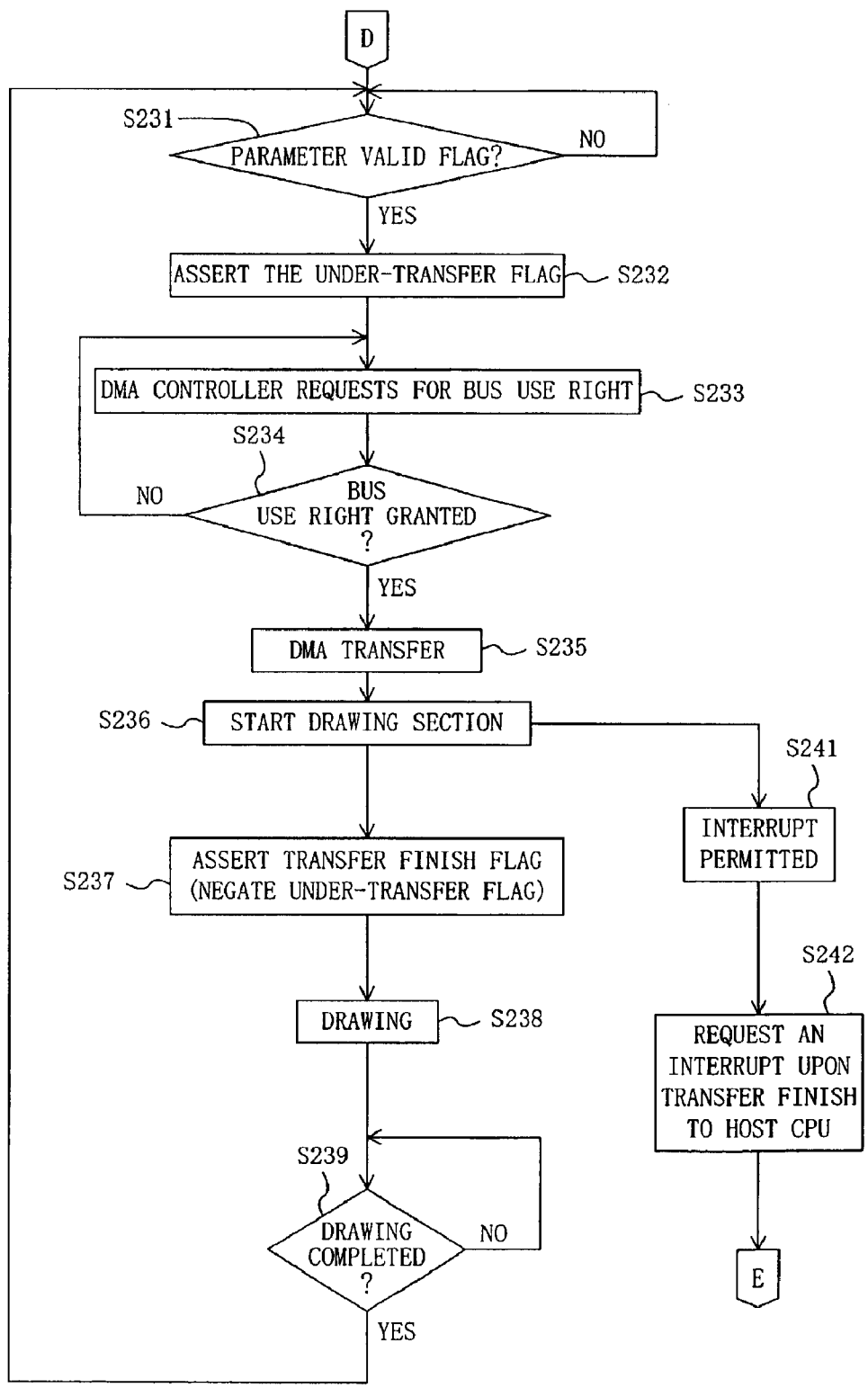
FIG. 11 is a flowchart of processing by the data processor of FIG. 9, showing processing related to a drawing processing unit.

FIGS. 10 and 11 are flowcharts of processing by the data processor of FIG. 9, in which FIG. 10 shows processing related to the host CPU 210 and FIG. 11 shows processing related to the drawing processing unit 230.

Figure 12:
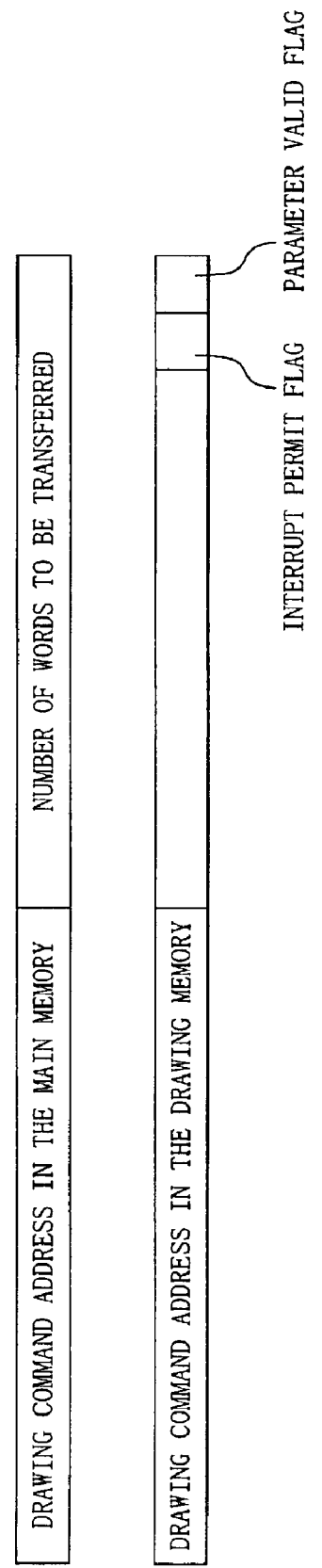
FIG. 12 is an illustration of an example of parameters held by a control register shown in FIG. 9.

FIG. 12 illustrates an example of parameters held by the control register 235 shown in FIG. 9. The control register 235 holds an interrupt permit flag in addition to the parameters held by the control register 35 of FIG. 4. The flow of processing by the data processor of FIG. 9 will be described with reference to FIGS. 9 to 12.

Processing in steps S211 to S213 is substantially the same as that in steps S31 to S33 described with reference to FIG. 6, and thus description thereof is omitted here.

In step S214, the host CPU 210 sets the interrupt permit flag, indicating whether or not the drawing processing unit 230 is permitted to generate an interrupt, in the control register 235 of the drawing processing unit 230, in addition to the head address of the drawing commands in the main memory 20, the number of words stored, and the destination address in the drawing memory 240 as the destination. The interrupt permit flag is used to notify the host CPU 210 of termination of data transfer related to the set parameters by means of an interrupt when the data transfer is terminated.

In step S215, the host CPU 210 determines whether or not it is necessary to generate drawing commands intended to be transferred next. If necessary, the process proceeds to step S216. Otherwise, the process proceeds to step S217, where the host CPU 210 terminates processing related to drawing and performs other processing.

In step S216, the host CPU 210 prepares the next drawing commands in the drawing command region of the main memory 20, and the process returns to step S215. The address in the main memory 20 at which the host CPU 210 stores the next drawing commands must be in a region totally irrelevant to the previous transfer. The host CPU 210 repeats the processing in steps S215 and S216 until there is no need to generate drawing commands intended to be transferred next.

Processing in steps S231 to S238 in FIG. 11 is substantially the same as the processing in steps S71 to S78 described with reference to FIG. 8, and thus the description thereof is omitted here. In step S239, when the drawing section 232 receives a drawing end instruction or determines that all transferred drawing commands have been processed, the drawing section 232 outputs the Done signal DS to the DMA controller 234 to complete the drawing processing and waits for input of a new drawing commands.

After completion of data transfer from the main memory in step S236, the DMA controller 234 examines the interrupt permit flag in the control register 235 set by the host CPU 210 in step S241.

If the interrupt permit flag is in the asserted state, the DMA controller 234 generates and outputs the interrupt signal IS to the host CPU 210, and then negates the interrupt permit flag in step S242. The host CPU 210 uses the timing of the interrupt signal IS as the timing at which the next data is transferred or generated, thereby transferring the next drawing data to the main memory 20 or generating drawing data to be next transferred.

In step S221 in FIG. 10, the host CPU 210 determines whether or not it is necessary to generate drawing commands intended to be transferred next. If necessary, the process proceeds to step S222. Otherwise, the interrupt processing is terminated, and the original processing resumes. In step S222, the host CPU 210 prepares the next drawing commands in the region of the main memory 20 in which the drawing commands have already been read. In step S223, the host CPU 210 updates data in the control register 235.

In the above description, the interrupt was generated upon termination of the transfer. Alternatively, an interrupt may be generated on the following occasion, for example. That is, when preparing data in the main memory 20, the host CPU 210 may insert an interrupt instruction at a position immediately after certain data at which notification of completion of data transfer so far is necessary. The DMA controller 234 predecodes advanced instructions in drawing data, such as line drawing and filling-in of an area, while transferring the data to the drawing memory 240 or to the drawing section 232. Therefore, when the DMA controller 234 decodes an interrupt instruction, it can generate an interrupt for the host CPU 210 to notify the host CPU 210 of the progress of the transfer.

As described above, by being timely notified of the transfer state, the host CPU can determine the timing at which the next data transfer to the drawing processing unit is started and the timing at which data into the main memory is prepared without delay behind the processing by the drawing processing section.

Embodiment 3

Figure 13:
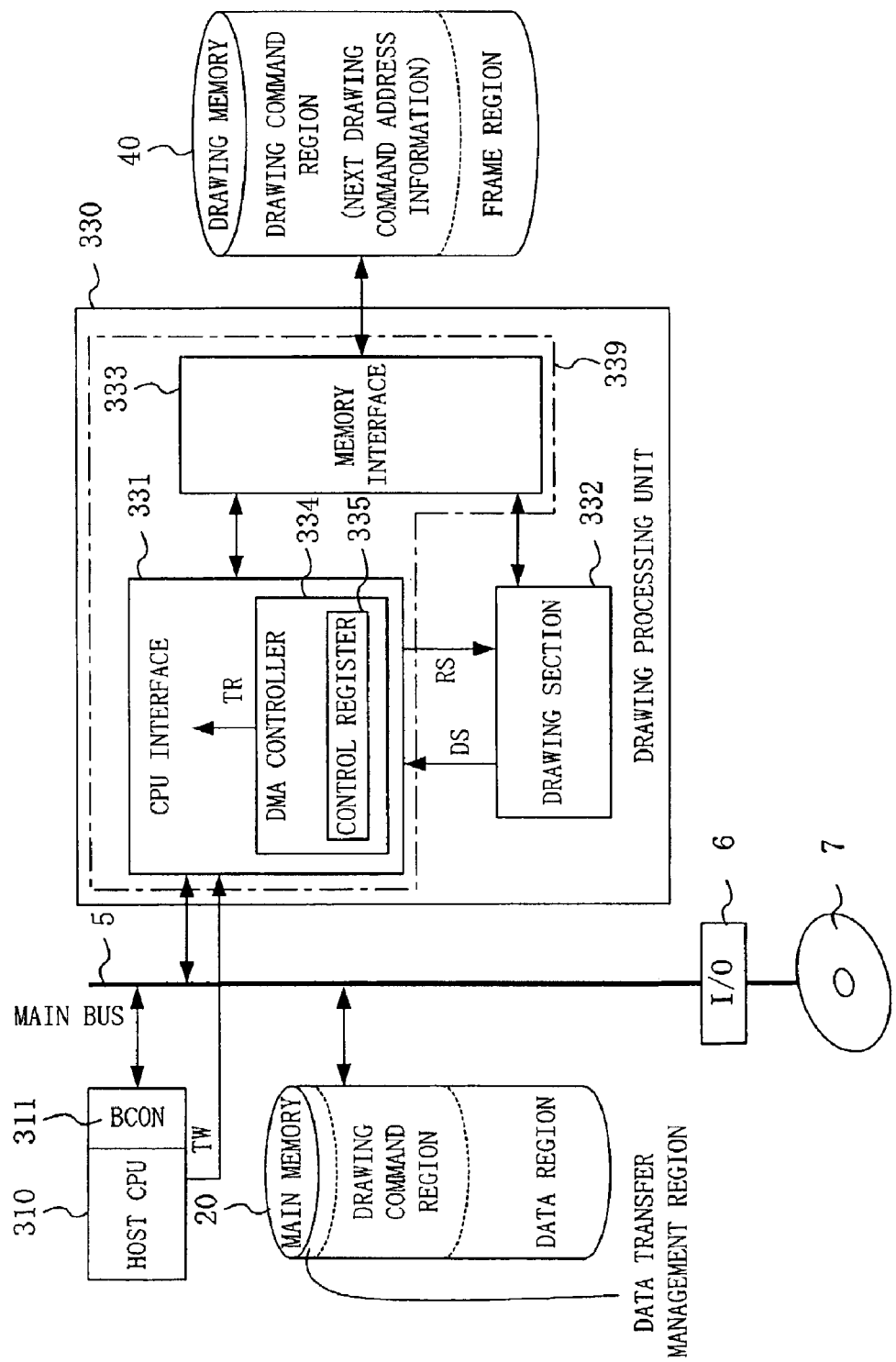
FIG. 13 is a block diagram of a data processor of Embodiment 3 of the present invention.

FIG. 13 is a block diagram of a data processor of Embodiment 3 of the present invention. The data processor of FIG. 13 includes a host CPU 310, a main memory 20, a drawing processing unit 330, a drawing memory 40, a main bus 5, an I/O block 6 and a DVD-ROM 7. The host CPU 310 corresponds to the host CPU 10 in FIG. 1. The same components as those of the data processor of FIG. 1 are denoted by the same reference numerals, and the description thereof is omitted here. The data processor of FIG. 13 has a feature that a data transfer wait register is used for control of DMA transfer.

The drawing processing unit 330 includes a CPU interface 331, a drawing section 332 for actually performing drawing processing, and a memory interface 333. The CPU interface 331, functioning as an interface with the main bus 5, includes a DMA controller 334. The DMA controller 334 includes a control register 335 for holding parameters required for DMA transfer, and controls data transfer between the main memory 20 and the drawing processing unit 330. The DMA controller 334 also receives a transfer wait signal TW from the host CPU 310. The drawing section 332 and the memory interface 333 correspond to the drawing section 32 and the memory interface 33 in FIG. 1, respectively. The CPU interface 331 and the memory interface 333 constitute an interface section 339.

Figure 14:
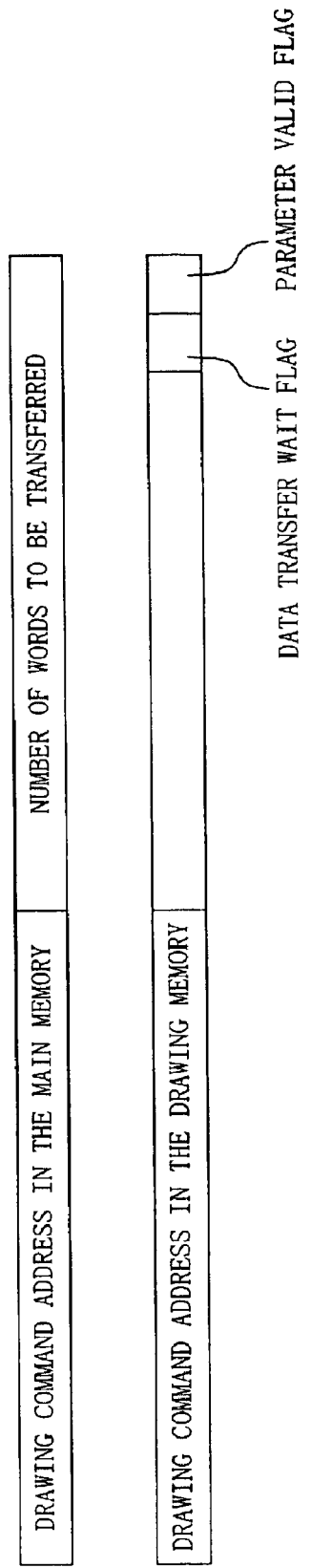
FIG. 14 is an illustration of an example of parameters held by a control register shown in FIG. 13.

FIG. 14 illustrates an example of parameters held by the control register 335 shown in FIG. 13. As shown in FIG. 14, the control register 335 holds a data transfer wait flag, in addition to the parameters held by the control register 35 of FIG. 4, to thereby additionally function as a data transfer wait register. The host CPU 310 asserts the transfer wait signal TW when it intends to halt DMA transfer temporarily, and sets the data transfer wait flag. In the aspects other than that described above, the data processor of this embodiment is the same as that of the data processor of FIG. 1.

There are cases that data totally different from a drawing command currently under transfer must be transferred before the DMA controller 334 negates the parameter valid flag. Examples of such cases are that a screen being scrolled rightward is suddenly scrolled downward, and that the host CPU 310 itself intends to generate image data and directly write the data into the frame region of the drawing memory 40. In such cases, the data processor of FIG. 13 can halt the current transfer temporarily, set new next drawing command address information, and newly transfer a drawing command or image data.

In the change of the transfer, if two channels of the control register 335 are provided, it is possible to skip data in the main memory 20 of which transfer is no more necessary and restart the data transfer from valid data. For example, if the host CPU 310 intends to transfer image data directly, parameters for transfer of normal map data may be held by one control register while parameters for transfer of image data may be held by the other control register.

Similar waste-avoiding transfer is possible when data to be processed is stream data, that is, data stored consecutively in the order of processing and processed sequentially. That is, if only the host CPU stores data in the main memory with no overlap of addresses, continuous data transfer is possible based on address information for next transfer by skipping an unnecessary region even when the data is not stored in succession.

Embodiment 4

Figure 15:
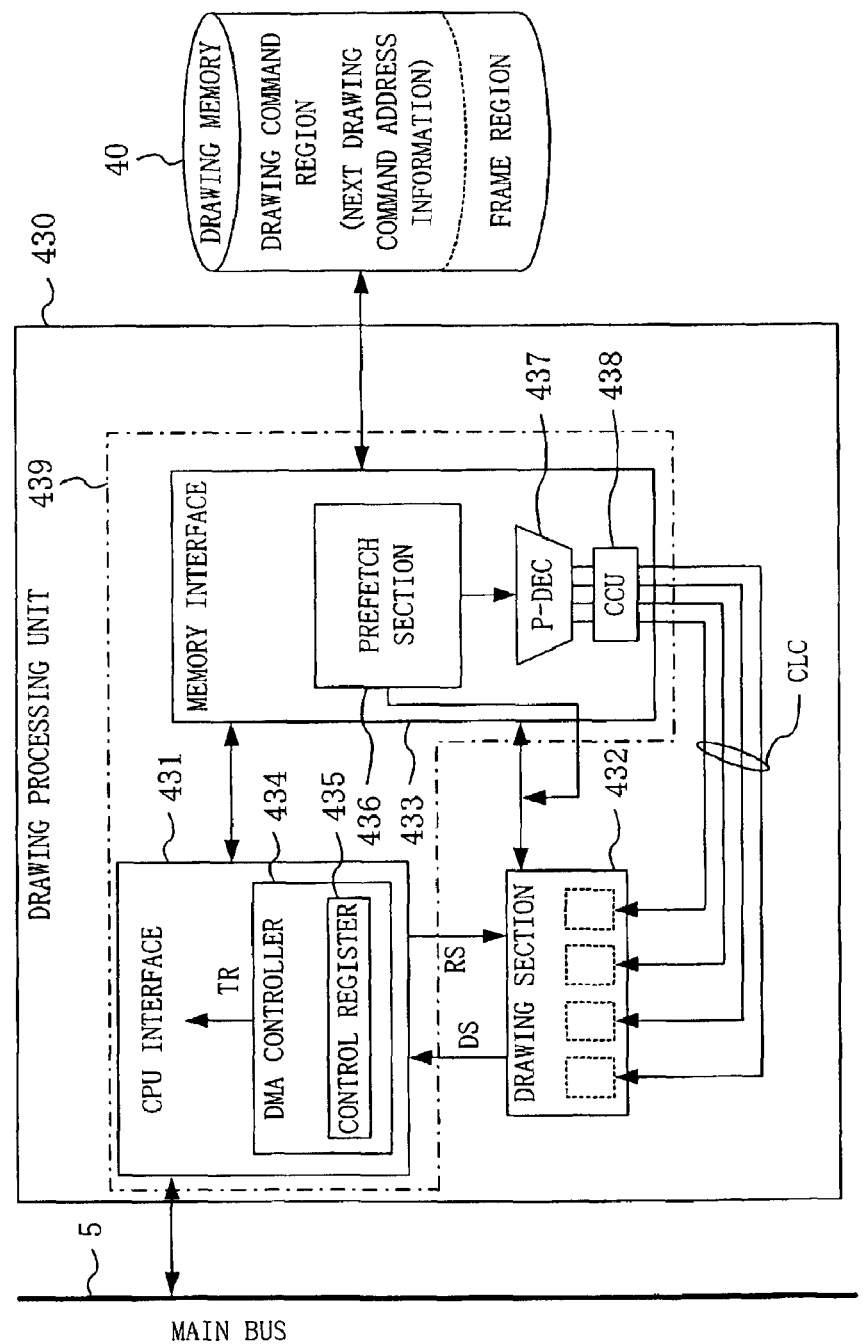
FIG. 15 is a block diagram of a data processor of Embodiment 4 of the present invention.

FIG. 15 is a block diagram of a data processor of Embodiment 4 of the present invention. The data processor of FIG. 15 is the same as the data processor of FIG. 1 except that a drawing processing unit 430 replaces the drawing processing unit 30 in FIG. 1. In FIG. 15, the host CPU, the main memory and the like, which are the same as those in FIG. 1, are omitted. The data processor of FIG. 15 controls supply of a clock signal in the drawing processing unit 430.

Referring to FIG. 15, the drawing processing unit 430 includes a CPU interface 431, a drawing section 432 for actually performing drawing processing, and a memory interface 433. The CPU interface 431 is the same as the CPU interface 31 shown in FIG. 1. The CPU interface 431 and the memory interface 433 constitute an interface section 439. The drawing section 432 includes a circuit for dot drawing (dot drawing data path), a circuit for line drawing (line drawing data path), and a circuit for polygon drawing (polygon drawing data path). The memory interface 433 includes a prefetch section 436, a predecoder 437 and a clock controller 438.

FIG. 16 illustrates an example of drawing commands received by the prefetch section 436 in FIG. 15. In FIG. 16, the prefix "OX" indicates that the subsequent value is in the hexadecimal notation.

Each of drawing commands such as DOT (dot drawing), POLYGON (polygon drawing) and LINE (line drawing) includes a first control field indicating start of the command located at the head of the command and a second control field indicating end of the command located at the end of the command. Each of the control fields is 8-bit wide, for example, with the four lower-order bits representing the type of the command and the four higher-order bits representing start or end of the command. For example, DOT command includes the first control field, the X coordinate, the Y coordinate and the second control field in this order.

The prefetch section 436, which is an interface with the drawing memory 40, prefetches a drawing command when the drawing command is newly transferred from the drawing memory 40 to the drawing section 432. The predecoder 437 predecodes the control fields of the drawing command temporarily held by the prefetch section 436. The clock controller 438 controls supply of a clock signal to the drawing section 432 according to the predecoding result outputted from the predecoder 437.

More specifically, the clock controller 438 supplies the clock signal only to one of the circuits of the drawing section 432 corresponding to the type of the drawing command that actually requires the clock signal for the processing of the drawing command. The clock controller 438 starts supply of the clock signal according to the first control field at the start of the command and halts the supply of the clock signal according to the second control field at the end of the command. As for the halt of supply of the clock signal, the predecoder 437 instructs the clock controller 438 to halt supply of the clock signal after waiting for a time period corresponding to the number of cycles required for the drawing section 432 to perform halt processing.

As described above, only necessary part of the drawing section 432 receives the clock signal. This contributes to reduction in power consumption. In the example shown in FIG. 16, each of the drawing commands DOT, POLYGON and LINE is transferred singly. When a succession of commands of one type, such as a succession of DOT commands, are transferred, however, the control field indicating end of the command for halting supply of the clock signal may be put only at the end of the succession of DOT commands.

Figure 17:
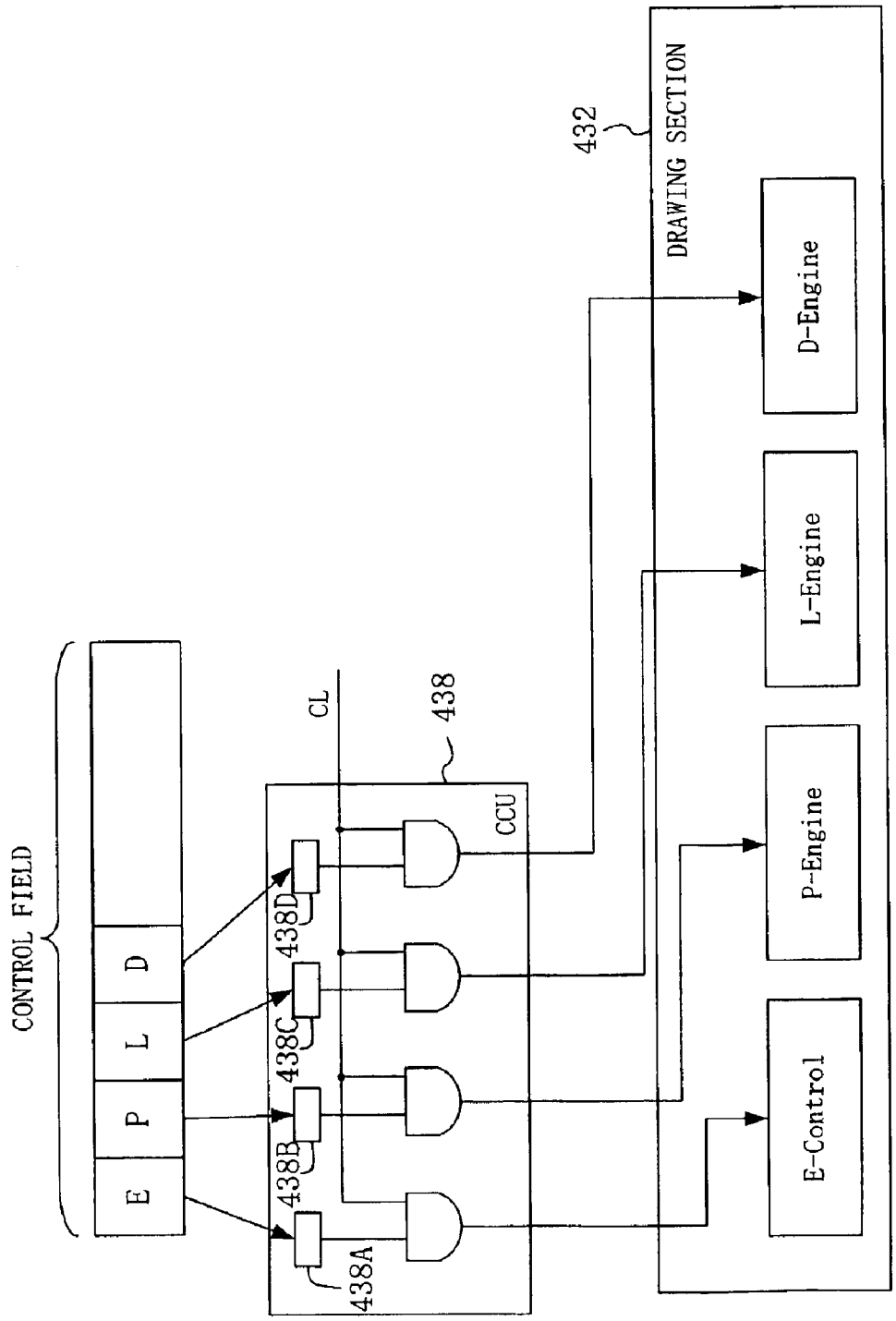
FIG. 17 is a diagrammatic illustration of a case of control of supply of a clock signal without use of a predecoder.

FIG. 17 diagrammatically illustrates an example of control of supply of a clock signal without use of the predecoder. In this example, the control fields of the drawing commands have bit fields corresponding to the types of the commands and the like. Specifically, as shown in FIG. 17, the control fields have 1-bit fields E, P, L and D associated with the data paths of the drawing section 432.

The bit fields E, P, L and D are asserted when the command is a command other than drawing, a POLYGON drawing type command, a LINE drawing type command and a DOT drawing type command, respectively. The clock controller 438 receives the bit fields E, P, L and D from the prefetch section 436, and supplies the clock signal CL to the dot drawing data path when bit field D is asserted, or to the polygon drawing data path when bit field P is asserted, for example.

The clock controller 438 includes latches 438A, 438B, 438C and 438D for latching the bit fields E, P, L and D, respectively. Therefore, the clock controller 438 can continue supply of the clock signal CL to the same data path until a new control field is sent.

As described above, it is possible to detect to which data path the clock signal should be supplied without the necessity of decoding. Therefore, reduction in power consumption is possible by controlling supply of the clock signal without use of a predecoder.

Embodiment 5

Figure 18:
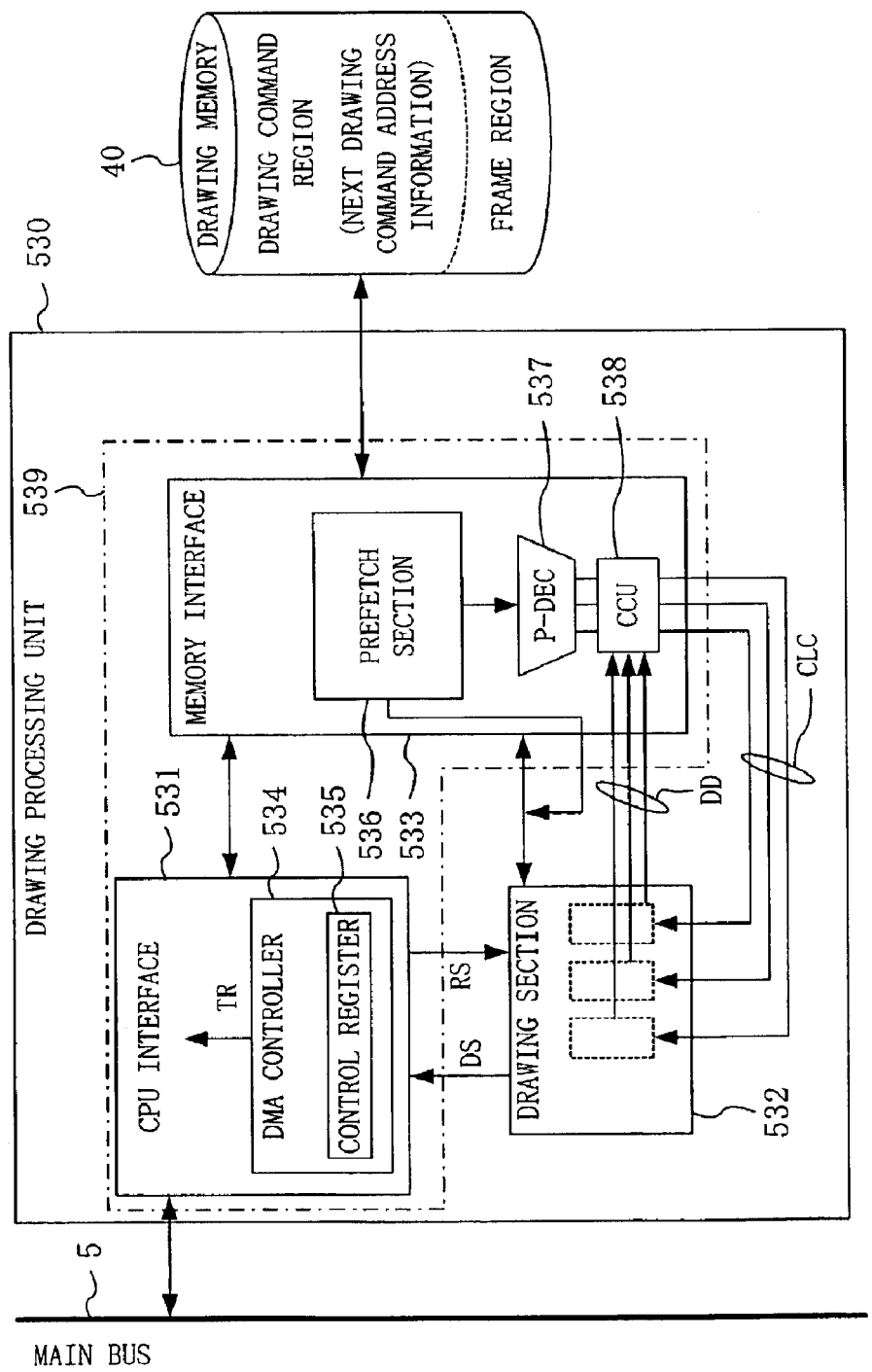
FIG. 18 is a block diagram of a data processor of Embodiment 5 of the present invention.

FIG. 18 is a block diagram of a data processor of Embodiment 5 of the present invention. The data processor of FIG. 18 is the same as the data processor of FIG. 1 except that a drawing processing unit 530 replaces the drawing processing unit 30 in FIG. 1. In FIG. 18, the host CPU, the main memory and the like, which are the same as those in FIG. 1, are omitted. In the data processor of FIG. 18, the drawing processing unit 530 makes a notification of termination of processing when the drawing processing unit 530 terminates the processing, to halt unnecessary supply of a clock signal.

Referring to FIG. 18, the drawing processing unit 530 includes a CPU interface 531, a drawing section 532 for actually performing drawing processing, and a memory interface 533. The CPU interface 531 is the same as the CPU interface 31 shown in FIG. 1. The CPU interface 531 and the memory interface 533 constitute an interface section 539. The configuration of the drawing commands is roughly the same as that described with reference to FIG. 16, except that in this embodiment, each command has no second control field.

Figure 19:
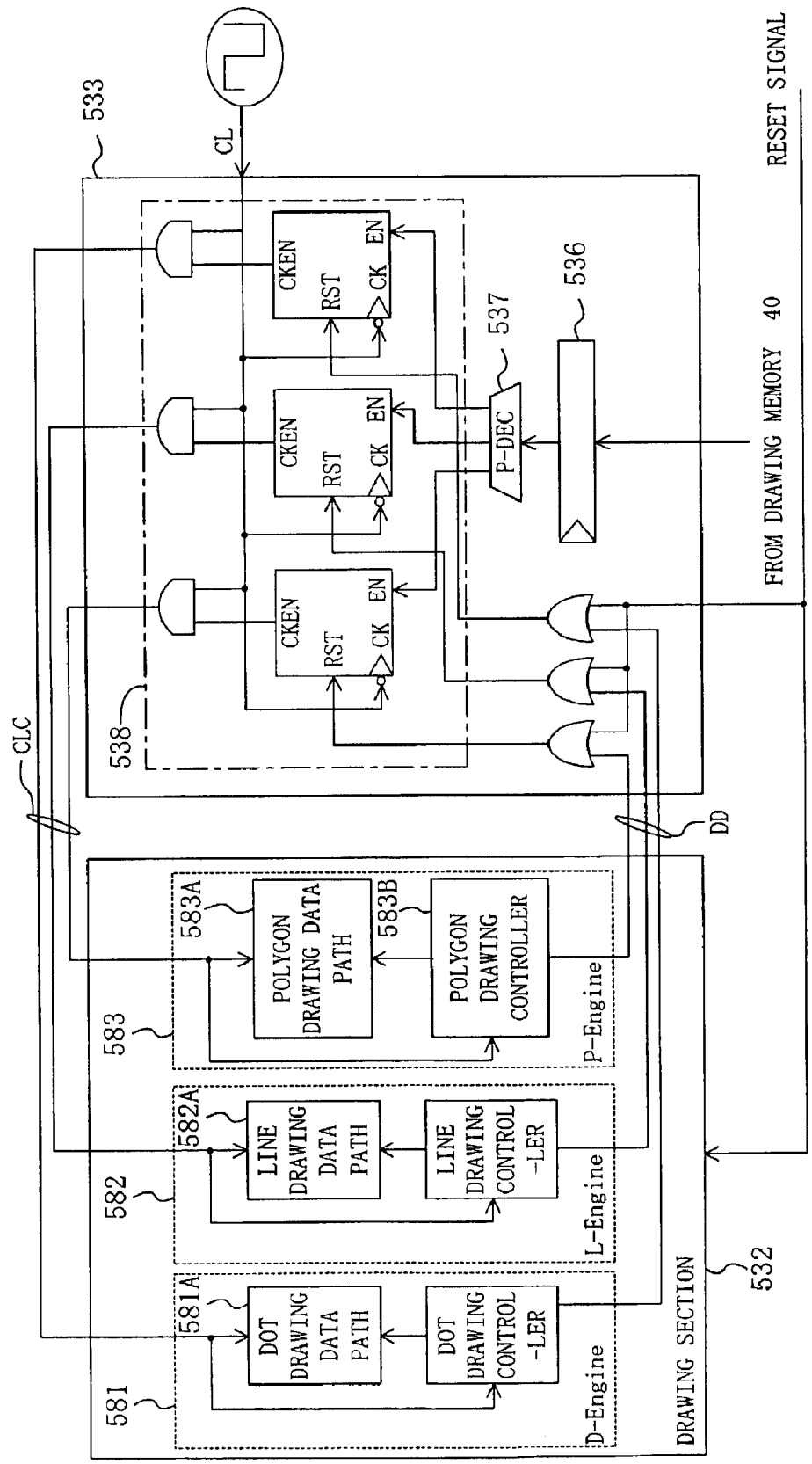
FIG. 19 is a block diagram of an example of details of a drawing section and a memory interface shown in FIG. 18.
Figure 20:
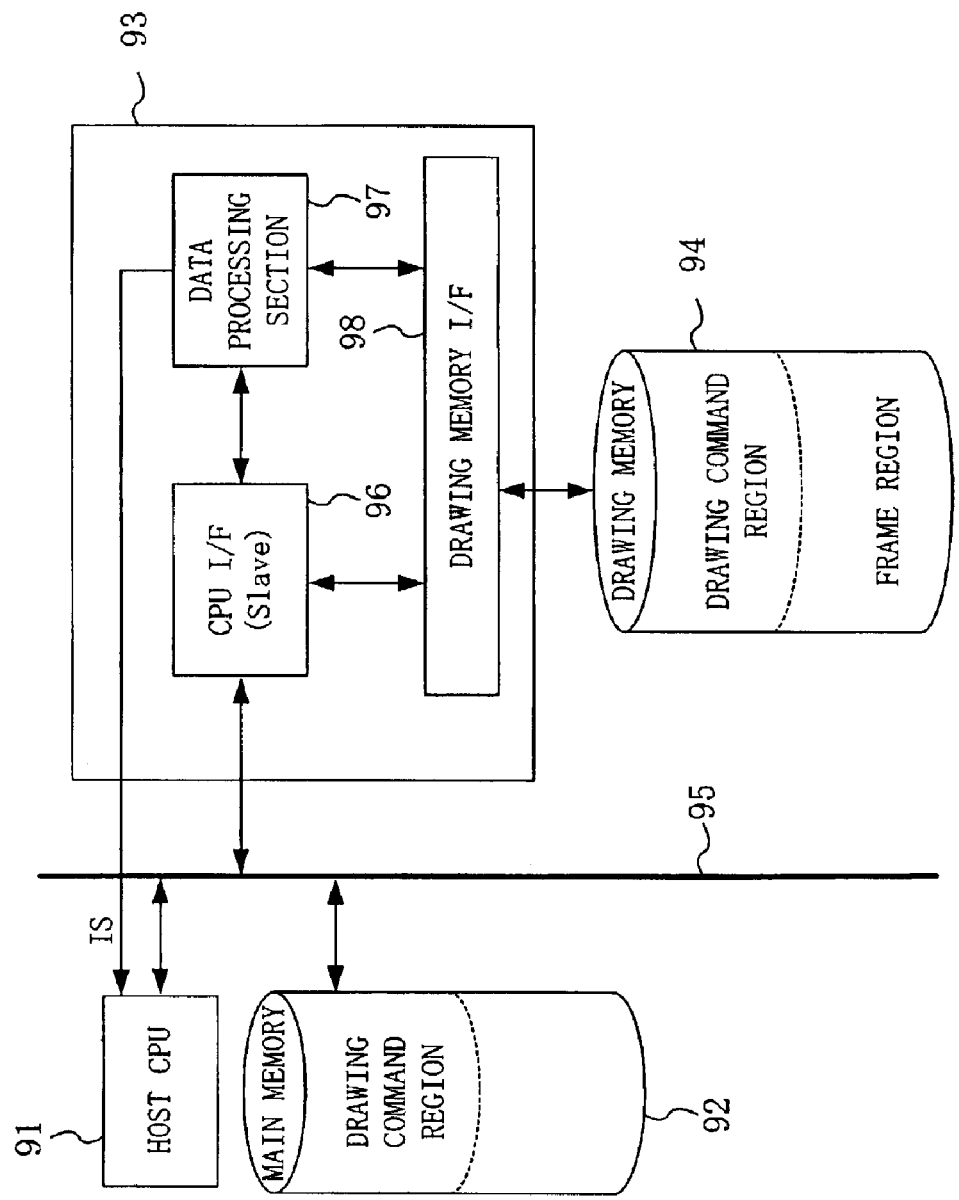
FIG. 20 is a block diagram of a conventional data processor.

FIG. 19 is a block diagram of an example of details of the drawing section 532 and the memory interface 533 in FIG. 18. The drawing section 532 includes a dot drawing block 581, a line drawing block 582 and a polygon drawing block 583. The dot drawing block 581 includes a dot drawing data path 581A and a dot drawing controller 581B. The line drawing block 582 includes a line drawing data path 582A and a line drawing controller 582B. The polygon drawing block 583 includes a polygon drawing data path 583A and a polygon drawing controller 583B. The memory interface 533 includes a prefetch section 536, a predecoder 537 and a clock controller 538.

The prefetch section 536 and the predecoder 537 operate in substantially the same manner as the prefetch section 436 and the predecoder 437 shown in FIG. 15. The clock controller 538 controls supply of a clock signal to the drawing blocks 581 to 583 according to the predecoding result outputted from the predecoder 537.

The clock controller 538 includes flipflops corresponding to the types of the drawing commands, and provides the predecoding result to the flipflops as an enable signal. As a result, the clock controller 538 sends the clock signal only to a block among the drawing blocks 581 to 583 corresponding to the type of the drawing command that actually requires the clock signal for the processing of the drawing command. The clock controller 538 starts supply of the clock signal according to the first control field at the start of the command.

Assume, for example, that the clock controller 538 selects the polygon drawing block 583 and is supplying the clock signal to the polygon drawing block 583. Once the drawing processing in the polygon drawing block is terminated, the polygon drawing controller 583B outputs a drawing done signal DD to the memory interface 533. On receipt of the drawing done signal DD, the corresponding flipflop is reset, and thus the clock controller 538 halts the supply of the clock signal to the polygon drawing block 583.

In the memory interface 533, the predecoder 536 predecodes data to be transferred next. The clock controller 538 selects the destination of supply of the clock signal according to the predecoding result, and supplies the clock signal to the selected drawing block for execution of drawing.

In this embodiment, the drawing blocks of the drawing section as the destination of supply of the clock signal themselves can determine halt of supply of the clock signal. Therefore, the clock controller 538 is relieved of considering the timing of halt of supply of the clock signal and the like, and yet reduction in power consumption is possible. In addition, it is possible to control the supply of the clock signal not only to the data paths, but also to the drawing controller controlling the data paths. This further reduces power consumption.

The predecoder may not be used, and the supply of the clock signal may be started in the manner described above with reference to FIG. 17 and halted upon receipt of the drawing done signal DD.

In the embodiments described above, the data processor executed drawing as an example of operation by processing drawing commands as operation data. The present invention is also applicable to data processors for performing other operations.

In the embodiments described above, drawing commands transferred from the main bus to the drawing memory were then transferred to the drawing section for drawing execution. Alternatively, drawing commands may be directly transferred from the main bus to the drawing section for drawing execution. In this case, in Embodiments 4 and 5, the CPU interface, not the memory interface, may be provided with the prefetch section, the clock controller and the like for control of the clock signal.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processor for processing operation data stored in a memory connected to an external bus in the order of operations, comprising:

an operation memory for storing the operation data transferred;

an interface section for holding addresses of the operation data required for transfer of the operation data; and an operation section receiving the operation data from the interface section for processing a command included in the operation data, wherein the interface section sequentially transfers the operation data from the memory connected to the external bus to the operation memory using the address, and sequentially transfers the operation data from the operation memory to the operation section, and wherein the interface section transfers transfer information for transfer of operation data to be next processed to the operation memory, together with the current operation data, and when reading the transfer information from the operation memory, the interface section transfers the operation data to be next to processed corresponding the transfer information from the memory connected to the external bus to the operation memory.

2. The data processor of claim 1, further comprising a data transfer management section for holding information indicating whether or not the interface section is under transfer of the operation data.

3. The data processor of claim 1, wherein the interface section notifies an external bus muster controlling the external nal bus of termination of transfer of the operation data by generating an interrupt.

4. The data processor of claim 1, wherein the interface section includes a data transfer wait register holding information set by the external bus master controlling the external nal bus when start of transfer of the operation data is newly required, and halts the current transfer of the operation data according to the information held by the data transfer wait register.

5. The data processor of claim 1, wherein the operation section includes a plurality of circuits for processing commands included in the operation data, and the interface section supplies a clock signal to a circuit among the plurality of circuits that processes a command included in the operation data transferred to the operation section according to a control field of the command.

6. The data processor of claim 5, wherein the interface section starts supply of the clock signal according to a first control field located at the head of the command, and halts the supply of the clock signal according to a second control field located at the end of the command.

7. The data processor of claim 5, wherein the circuit of the operation section receiving the clock signal outputs a done signal indicating termination of the processing of the transferred command to the interface section, and the interface section starts supply of the clock signal according to a control field located at the head of the command, and halts the supply of the clock signal to the circuit that has outputted the done signal upon receipt of the done signal.

8. A data transfer method for transferring operation data stored in a memory connected to an external bus in the order of operations, comprising the steps of:

storing addresses of the operation data required for transfer of the operation data; and transferring the operation data sequentially from the memory connected to the external bus to an operation memory using the addresses, and transferring the operation data sequentially from the operation memory to an operation section in which processing of a command included in the operation data is performed, wherein the step of transferring the operation data comprises the steps of:

transferring transfer information for transfer of operation data to be next processed to the operation memory together with the current operation data; and when reading the transfer information from the operation memory, transferring the operation data to be next processed corresponding to the transfer information from the memory connected to the external bus to the operation memory.

9. The method of claim 8, wherein the step of transferring the operation data comprises the step of holding information indicating whether or not the operation data is under transfer.

10. The method of claim 8, further comprising the step of notifying an external bus master controlling the external bus of termination of transfer of the operation data by generating an interrupt.

11. The method of claim 8, further comprising the steps of:

allowing an external bus master controlling the external bus to set information when start of transfer of the operation data is newly required; and halting the current transfer of the operation data according to the information let by the external bus muter.

* * * * *